(12) United States Patent
Hyder et al.

(10) Patent No.: US 9,727,827 B2
(45) Date of Patent: Aug. 8, 2017

(54) METHOD AND SYSTEM FOR REFERRAL TRACKING

(75) Inventors: Adam Hyder, Los Altos, CA (US); Syed Mohammed Ali, Sunnyvale, CA (US); Varun Aggarwal, San Jose, CA (US); Changsheng Chen, Castro Valley, CA (US); Kam Wing Chu, Burlingame, CA (US)

(73) Assignee: Jobvite, Inc., San Mateo, CA (US)

( * ) Notice: Subject to any disclaimer, the term of this patent is extended or adjusted under 35 U.S.C. 154(b) by 316 days.

(21) Appl. No.: 13/168,665

(22) Filed: Jun. 24, 2011

(65) Prior Publication Data
US 2012/0330701 A1 Dec. 27, 2012

(51) Int. Cl.
*G06Q 10/00* (2012.01)
(52) U.S. Cl.
CPC .................................. *G06Q 10/00* (2013.01)
(58) Field of Classification Search
CPC ...................................................... G06Q 10/00
USPC ...................... 705/7.11, 14.16, 321
See application file for complete search history.

(56) References Cited

U.S. PATENT DOCUMENTS

| 5,826,022 | A | 10/1998 | Nielsen |
| 5,937,162 | A | 8/1999 | Funk et al. |
| 6,112,209 | A | * 8/2000 | Gusack |
| 6,141,666 | A | 10/2000 | Tobin |
| 6,163,802 | A | 12/2000 | Lin et al. |
| 6,192,396 | B1 | 2/2001 | Kohler |
| 6,381,592 | B1 | 4/2002 | Reuning |
| 6,385,620 | B1 | 5/2002 | Kurzius et al. |
| 6,449,765 | B1 | 9/2002 | Ballard |
| 6,618,747 | B1 | 9/2003 | Flynn et al. |
| 6,662,194 | B1 | 12/2003 | Joao |
| 6,721,784 | B1 | 4/2004 | Leonard et al. |
| 6,968,313 | B1 | 11/2005 | Oran |
| 6,976,056 | B1 | 12/2005 | Kumar |

(Continued)

FOREIGN PATENT DOCUMENTS

CA 1318036 C 5/1993

OTHER PUBLICATIONS

"Social Media and Recruiting a Diverse Workforce—Can you have both???", Tutton, Nikole, http://www.recruitingblogs.com/profiles/blogs/social-media-and-recruiting-a?xg_source=activity, pp. 1-4.*

(Continued)

*Primary Examiner* — Jonathan G Sterrett
(74) *Attorney, Agent, or Firm* — Osha Liang LLP

(57) ABSTRACT

A method for identifying a source of a job referral, the method including identifying a URL that the job applicant uses to access a web page with functionality to enable the job applicant to apply for the first job, identifying a first job message record using the URL, obtaining an original job message record for an original job message using the first job message record, determining a first sender of the original job message from the original job message record, determining that a second job message was sent to the job applicant for a second job at the company by a second sender, wherein the second job message was sent to the job applicant before the first job message and wherein the second job message was sent to the job applicant within a look-back period, and identifying the second sender as the source of the referral for the first job.

9 Claims, 25 Drawing Sheets

(56) References Cited

U.S. PATENT DOCUMENTS

| | | | |
|---|---|---|---|
| 7,158,986 | B1 | 1/2007 | Oliver et al. |
| 7,310,626 | B2* | 12/2007 | Scarborough et al. ......... 706/60 |
| 7,558,795 | B2 | 7/2009 | Malik et al. |
| 7,617,176 | B2* | 11/2009 | Zeng et al. |
| 7,774,229 | B1 | 8/2010 | Dernehl et al. |
| 8,001,057 | B1* | 8/2011 | Hill ............................... 705/321 |
| 2005/0216295 | A1 | 9/2005 | Abrahamsohn |
| 2005/0261965 | A1 | 11/2005 | Eisen et al. |
| 2006/0042483 | A1 | 3/2006 | Work et al. |
| 2006/0224721 | A1* | 10/2006 | Rowe et al. .................. 709/224 |
| 2006/0224729 | A1* | 10/2006 | Rowe et al. .................. 709/224 |
| 2006/0242014 | A1* | 10/2006 | Marshall et al. ............... 705/14 |
| 2006/0253315 | A1 | 11/2006 | Ramsey et al. |
| 2006/0265267 | A1 | 11/2006 | Chen et al. |
| 2007/0043603 | A1 | 2/2007 | Andersen et al. |
| 2008/0091820 | A1* | 4/2008 | Norman et al. ............. 709/224 |
| 2008/0172415 | A1 | 7/2008 | Fakhari et al. |
| 2009/0299993 | A1 | 12/2009 | Novack |
| 2010/0036712 | A1* | 2/2010 | Abrahamsohn ................. 705/10 |
| 2010/0131418 | A1 | 5/2010 | McCagg et al. |
| 2010/0191589 | A1* | 7/2010 | Matte ......................... 705/14.16 |
| 2011/0022528 | A1 | 1/2011 | Hennessy |
| 2011/0112976 | A1 | 5/2011 | Ryan et al. |
| 2011/0196802 | A1* | 8/2011 | Ellis et al. .................... 705/321 |
| 2011/0276376 | A1* | 11/2011 | Schmitt ...................... 705/14.16 |
| 2012/0095931 | A1* | 4/2012 | Gurion et al. ................ 705/319 |

OTHER PUBLICATIONS

The Use of Social Networking Websites as a Recruiting Tool for Employers, J Vicknair, D Elkersh, K Yancey . . . —American Journal of . . . , 2010—cluteonline.com.* http://web.jobvite.com/rs/jobvite/images/Jobvite%202010%20Social%20Recruiting%20Report_2.pdf, 2010.*

Improving the Use of Technology in US Army Recruitment L Gui—Revitalizing Military Recruitment Without Restoring the . . . , 2009—wws.princeton.edu.*

Gendering the Job: Networks and Recruitment at a Call Center1 RM Fernandez, ML Sosa—American Journal of Sociology, 2005—JSTOR.*

"How Julius Caesar invented job referrals" retrieved from http://theundercoverrecruiter.com/infographic-how-julius-caesar-invented-employee-referrals/ on Apr. 15, 2015.*

C.E. McCollister, Ensuring electronic mail system delivery capability, IEEE Military Communications, vol. 1, 1999 (5 pages).

R-coupon brochure, "Generating and Harvesting Goodwill by Enhancing Word of Mouth Marketing" (2 pages).

R-coupon brochure, "Harvesting Goodwill through Relationship Referral Marketing" (5 pages).

Web Archive, "Recommend.it.com" Jun. 10, 1988 (4 pages).

Dialog file 636 #03631982 entitled "Argos Business Solutions: customer referral scheme encourages sale of mobile phones" M1 press wire, PNA, Jul. 8, 1997 (2 pages).

* cited by examiner

METHOD AND SYSTEM FOR REFERRAL TRACKING

CROSS-REFERENCE TO RELATED APPLICATIONS

The present application contains subject matter that may be related to the subject matter in the following U.S. applications Ser. No. 13/168,676 filed on Jun. 24, 2011, and assigned to the assignee of the present application: "Method and System for Channel Optimization".

BACKGROUND

When companies are looking to hire a new employee for a job, they encourage their employees and third parties (e.g., recruiters) to tell people they know to apply for the job. Companies often use a referral bonus as an incentive for this behavior. However, when an individual applies for a job, the company must rely on ad hoc systems to determine who referred the individual so that the company can pay the referral bonus to the appropriate employee or third party. This is a non-trivial process as companies are typically not able to track how and by whom the job was referred to the individual who applied for the job.

SUMMARY

In general, in one aspect, the invention relates to a non-transitory computer readable medium comprising instructions, which when executed by a processor performed a method for identifying a source of a job referral, the method includes identifying a job applicant for a first job at a company, identifying a uniform resource locator (URL) that the job applicant uses to access a web page, wherein the web page includes functionality to enable the job applicant to apply for the first job, identifying a first job message record using the URL, obtaining an original job message record for an original job message using the first job message record, determining a first sender of the original job message from the original job message record, determining that a second job message was sent to the job applicant for a second job at the company by a second sender, wherein the second job message was sent to the job applicant before the first job message and wherein the second job message was sent to the job applicant within a look-back period, and identifying the second sender as the source of the job referral for the first job.

In general, in one aspect, the invention relates to a system. The system includes a referral tracking service configured to receive a request to display a first web page at a first URL, wherein the first URL is associated with a first job at a company, a first sender, a first target, and a first communication channel, provide the first web page associated with the first URL, wherein the first web page comprises a description of the first job and a first job referral path, wherein the first job referral path comprises a visual representation of a link between the first sender and the first target, receiving a request to display a second web page at a second URL, and providing the second web page corresponding to the second URL, wherein the second web page comprises the description of the job and a second job referral path, wherein the second job referral path comprises a visual representation of the link between the first sender and the first target and a link between the first target and a second target, and a job message service configured to receive a request to create a job message for the first job, wherein the request comprises the second target and a second communication channel, generate, in response to the request, the job message wherein the job message is associated with the second URL, and wherein the second URL is associated with the first job, the first target, the second target, the first communication channel, and the second communication channel, a channel interface engine configured to send the job message over the second communication channel to the second target.

Other aspects of the invention will be apparent from the following description and the appended claims.

BRIEF DESCRIPTION OF DRAWINGS

FIG. 5A-5F show example screenshots in accordance with one or more embodiments of the invention.

DETAILED DESCRIPTION

Figure 1:
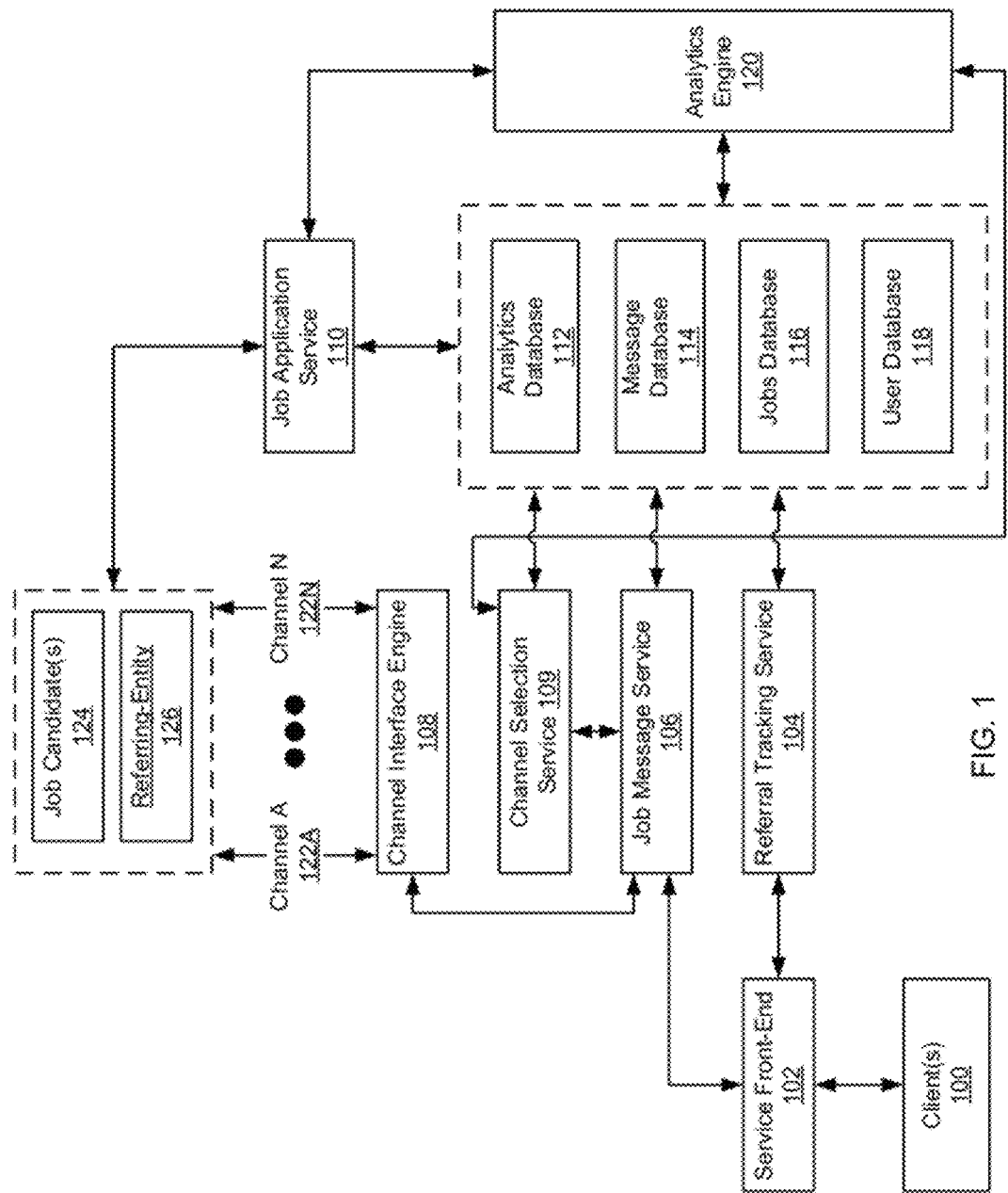
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention relate to a method and system for referral tracking. More specifically, embodiments of the invention relate to identifying targets (i.e., job candidates and/or referral entities) for a job, determining a communication channel over which to communicate with the targets, and tracking the propagation of job referral across multiple communication channels. In one embodiment of the invention, tracking the propagation of job referrals allows companies to determine the source of the referrals as well as the effectiveness of the various communication channels used in the referral process.

FIG. 1 shows a system in accordance with one or more embodiments of the invention. The system includes one or more clients (100), a service front-end (102), a referral tracking service (104), a job message service (106), a channel interface engine (108), a channel selection service (109), a job application service (110), an analytics database (112), a message database (114), a jobs database (116), a user database (118), and an analytics engine (120). Each of these components is described below.

In one embodiment of the invention each client (100) corresponds to a remote system configured to interface with the service front-end (102). The client may be a mobile device (e.g., smart phone, iPad, tablet computer, laptop, etc.)

or any other non-mobile computer device (e.g., desktop, etc.) with functionality to interface with the service front-end. Such functionality may include, but is not limited to, a web browser or standalone application and a network connection.

In one embodiment of the invention the service front-end (102) includes functionality to interface with the clients (100), the referral tracking service (104) (described below), and the job message service (106) (described below). In one embodiment of the invention, the service front-end is implemented as a web-server configured to serve web pages to the client and to receive input from the client via the client's web browser and/or a standalone application on the client. In one embodiment of the invention, if the client is executing a web browser to interface with the service front-end, then the service front-end includes the web pages to send to the client(s). Upon receipt of input from the client, the service front-end is configured to extract and, if necessary, modify the input, prior to sending the input to the referral tracking service (104) (described below), and/or the job message service (106) (described below). Similarly, upon receipt of data from the referral tracking service (104) and/or the job message service (106), the service front-end is configured to perform the required formatting of such data, prior to sending the formatted data to the client(s). In one embodiment of the invention, the service front-end may interact with multiple clients simultaneously.

In one embodiment of the invention, the referral tracking service (104) is configured to tracking how job messages and broadcast job messages are propagated over the various communication channels. In one embodiment of the invention the job message service (106) is configured to create job messages and broadcast job messages. Once created, the job message service forwards the job messages and/or broadcast job messages to the channel interface engine. In one embodiment of the invention the channel interface engine (108) includes functionality to send or otherwise communicate the job message or broadcast job message on the communication channel specified in the job message or broadcast job message. In one embodiment of the invention, a communication channel (122A, 112N) refers to any service and/or social network that supports the communication of job messages and/or broadcast job messages to job candidates (124) or referring-entities (126) (i.e., individuals or companies that may forward the broadcast job message or job message to job candidates or to other referring-entities). Examples of services include, but are not limited to, electronic mail (e-mail), short message service (SMS), TWITTER, Craigslist, and blogs. Examples of social networks include, but are not limited to, FACEBOOK, LINKEDIN, and MYSPACE. In one embodiment of the invention, communication channels used to communicate job messages may be referred to as direct communication channels. Examples of direct communication channels may include, but are not limited to, e-mail, LINKEDIN InMail, TWITTER messages (also referred to as direct messages), and SMS. In one embodiment of the invention, communication channels that are used to communicate broadcast job messages may be referred to as broadcast communication channels. Examples of broadcast communication channels may include, but are not limited to, a blog, CRAIGSLIST, a FACEBOOK status update, a LINKEDIN update, a TWITTER status update, a FACEBOOK wall post, and a LINKEDIN group post. TWITTER is a registered trademark of Twitter, Inc. of California, U.S.A. FACEBOOK is a registered trademark of Facebook, Inc. of California, U.S.A. MYSPACE is a registered trademark of MySpace, Inc. of California, U.S.A. LINKEDIN is a registered trademark of LinkedIn, Inc. of California, U.S.A. CRAIGSLIST is a registered trademark of Craigslist, Inc. of California, U.S.A.

In one embodiment of the invention, the channel selection service (109) includes functionality to determine the most effective communication channel(s) over which to communicate with a target. In one embodiment of the invention, the channel selection service (109) uses the data in one or more of the following databases to identify the most effective communication channel(s) over which to communicate with a target: analytics database (112), message database (114), jobs database (116), and user database (118). In one embodiment of the invention, the effectiveness of a given communication channel is based on the frequency at which the target (or entities similar to the target) has performed an action on or related to job messages or broadcast job messages communicated over the channel. Examples of actions include, but are not limited to, opened job message/broadcast job message, read job message/broadcast job message, forwarded job message/broadcast job message, and/or applied for job specified in job message/broadcast job message. In one embodiment of the invention, various metrics related to the effectiveness of given communication channels are shown in FIG. 5F. Those skilled in the art will appreciate that the invention is not limited to the metrics shown in FIG. 5F.

In one embodiment of the invention the job application service (110) includes functionality to allow a job applicant to apply for one or more jobs. The job application service may include functionality to allow the job applicant to upload a resume, a cover letter, reference letters, and/or provide additional information as required by the company that posted the job.

In one embodiment of the invention the message database (114) includes job messages (200), message records (202), broadcast job message records (204), and message view records (210). The contents of these records are described below in FIGS. 2A-2G. In one embodiment of the invention the jobs database (116) includes job records (206). The contents of these records are described below in FIGS. 2A-2G. In one embodiment of the invention the user database (118) includes user records (208). The contents of these records are described below in FIGS. 2A-2G.

In one embodiment of the invention the analytics engine (120) includes functionality to analyze the records in the message database (114), the jobs database (116), and/or user database (118) to determine, for example, the source of a given job applicant (i.e., who should get credit for referring the job applicant), the job referral path for a given job applicant (i.e., the chain of job messages and/or broadcast job messages from the original sender to the job applicant), and effectiveness of the various communication channels used to communicate with job candidates (124) and/or referring-entities (126). In one embodiment of the invention, an analytics database (112) is configured to store the results of generated by the analytics engine.

In one embodiment of the invention, the analytics database (112), the message database (114), the jobs database (116), and the user database (118) may be implemented using any persistent data storage device and/or technology including, but not limited to, magnetic storage, and solid state storage. Further, those skilled in the art will appreciate that the invention is not limited to the implementation shown in FIG. 1. The various components in FIG. 1 may be omitted, combined or otherwise re-configured without departing from the invention.

Figure 2A:
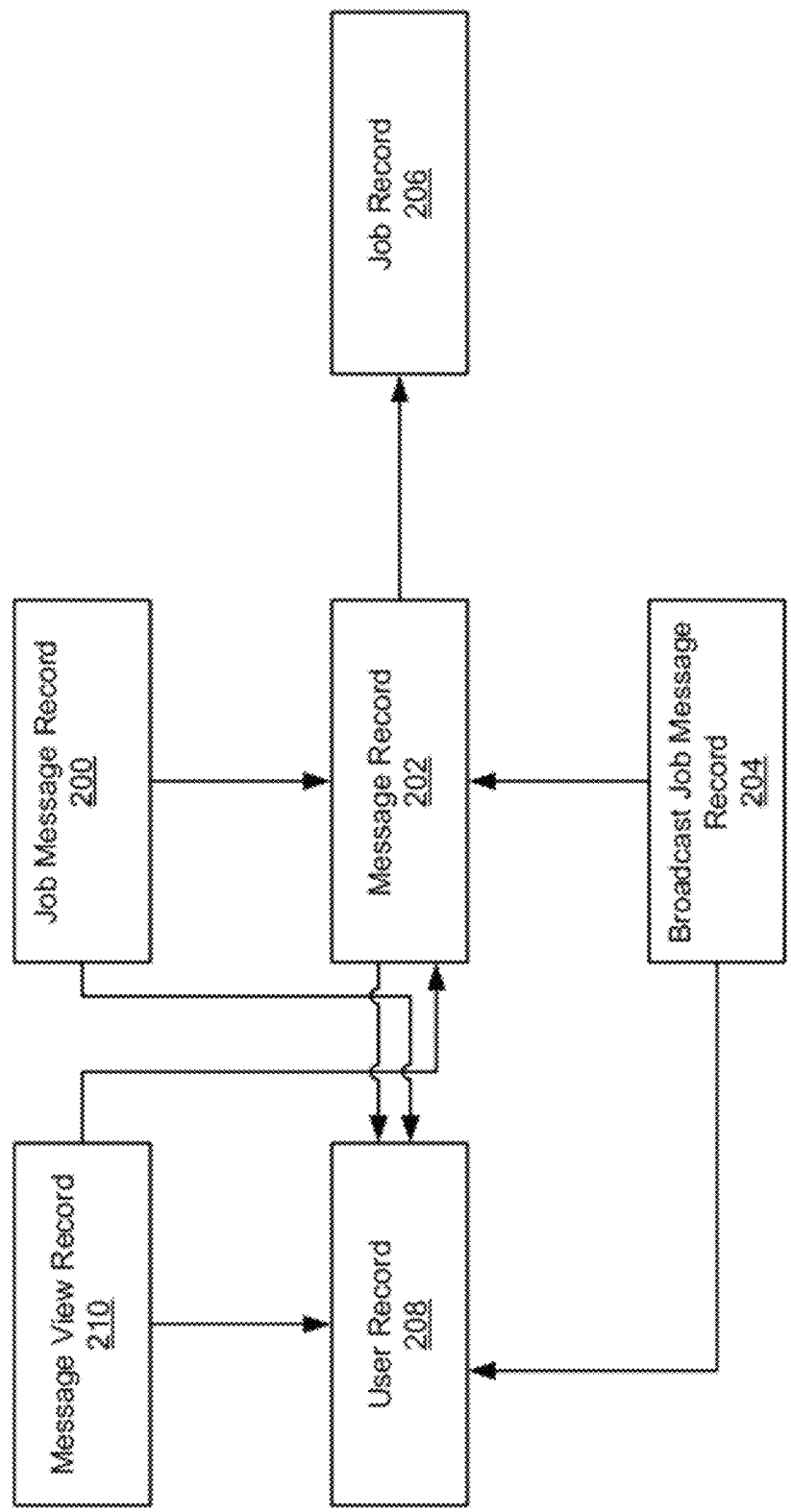
FIGS. 2A-2G show data structures in accordance with one or more embodiments of the invention.

FIGS. 2A-2G show data structures in accordance with one or more embodiments of the invention. FIG. 2A shows the relationship between the various messages in accordance with one or more embodiments of the invention. In one embodiment of the invention, jobs are communicated to job candidates (i.e., an individual that may be qualified to apply for the job) and/or to referral-entities. Those skilled in the art will appreciate that a single user may be act as both a job candidate and a referral-entity for a particular job. Further, those skilled in the art will appreciate that a single user may be act as a job candidate for particular jobs and a referral-entity for other jobs. The jobs are communicated as either job messages or broadcast job messages. Job messages are used to communicate with a single identified job candidate or referral-entity. In contrast, broadcast job messages are used to communicate with a group of job candidates or referral-entities, where no specific job candidate or referral-entity is known at the time the broadcast message is sent.

Figure 3A:
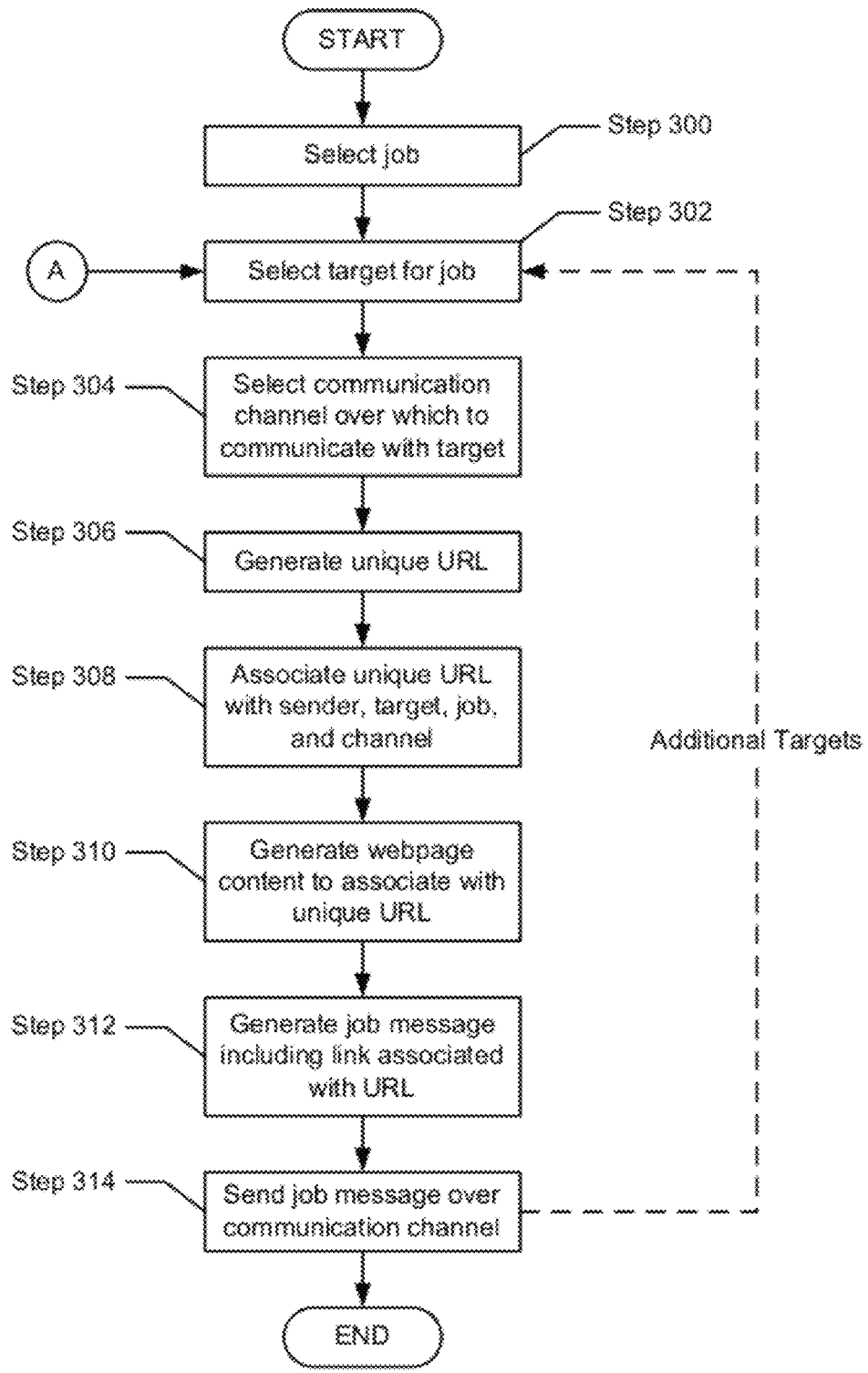
FIGS. 3A-3D show flowcharts in accordance with one or more embodiments of the invention.
Figure 3B:
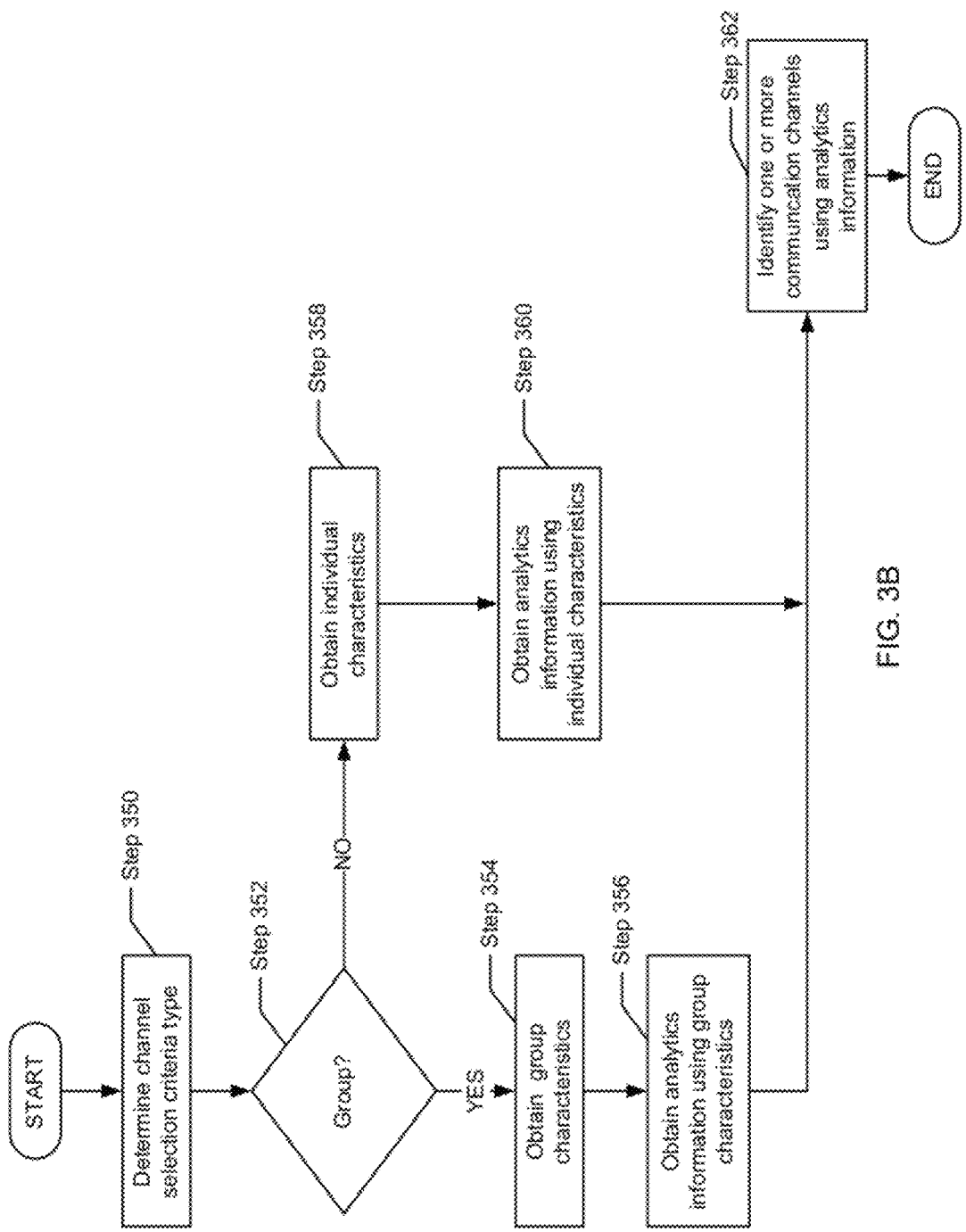
Figure 3C:
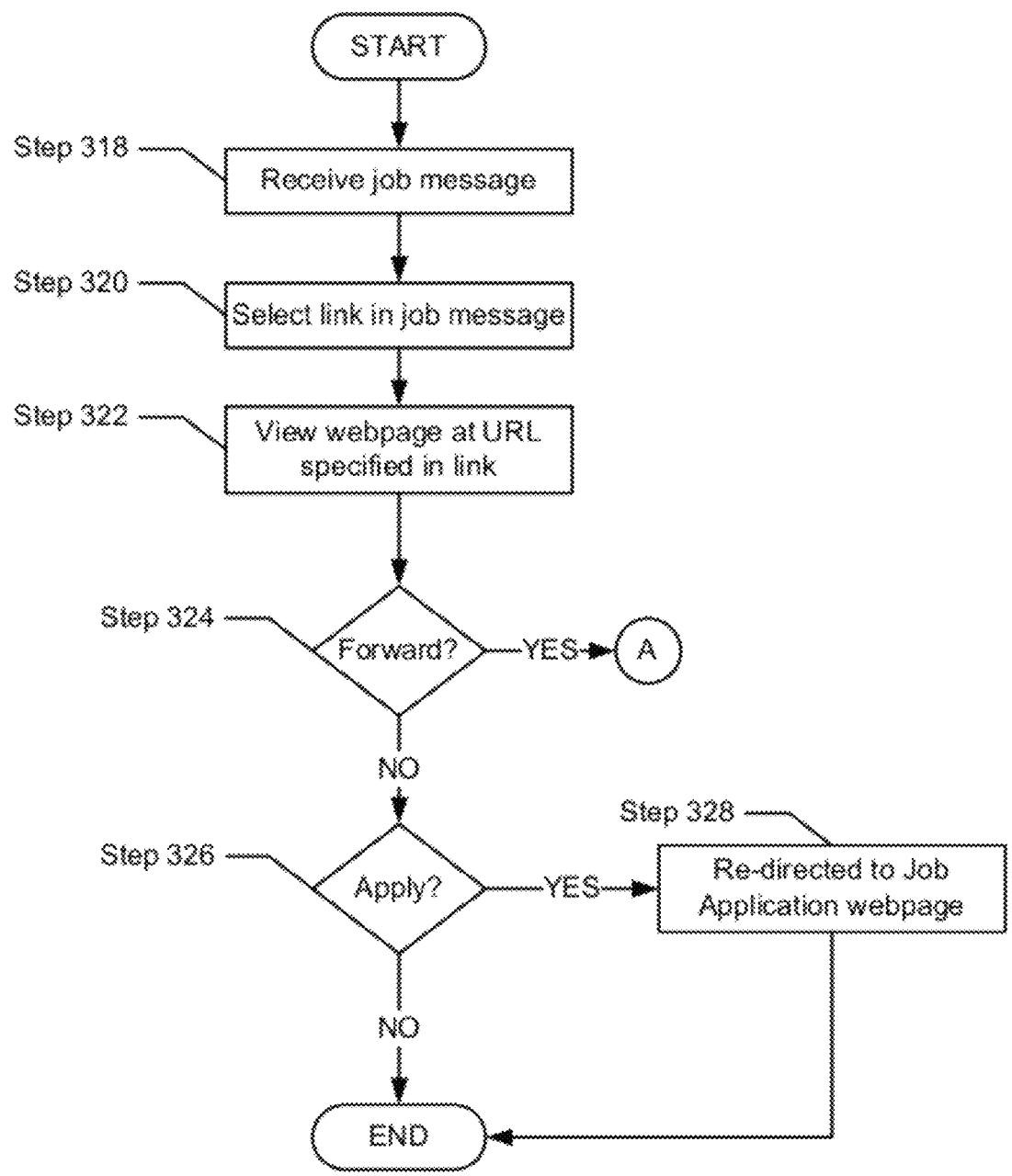

In one embodiment of the invention, a referral-entity is any user that receives a job message or broadcast job message and then forwards the job, e.g., using the method shown in FIGS. 3A and 3C, to another user. The user that receives a job message or broadcast job message from a referral-entity may be a job candidate, a referral-entity, or both. Examples of referral-entities may include, but are not limited to, recruiters hired by the company offering the job, employees of the company offering the job, individuals in a user's social network (i.e., the social network of the individual who is creating the original job message/broadcast job message, e.g., per FIG. 3A or the social network of the individual who has received a job message/broadcast job message for a job and is forwarding, e.g., per FIGS. 3A and 3C), or any other individual that creates a job message/broadcast job message in accordance with FIGS. 3A and 3C and/or using any of the functionality shown in any of the screenshots shown in FIG. 4A-4G.

Each job message is associated with a job message record (200) and each broadcast job message record is associated with a broadcast job message record (204). Each job message record is associated with a message record (202) and two user records (208) (i.e., a sender and a target) and each broadcast job message record (204) is associated with a message record (202) and a single user record (208) (i.e., a sender). Each message record (202) is associated with a single user record (208) and a job record (206). Finally, each message view record (210) is associated with a single user record (208) and a single message record (202). In one embodiment of the invention, the various records are associated with each other using the corresponding record IDs. The content of each of these records is discussed below.

Figure 2C:
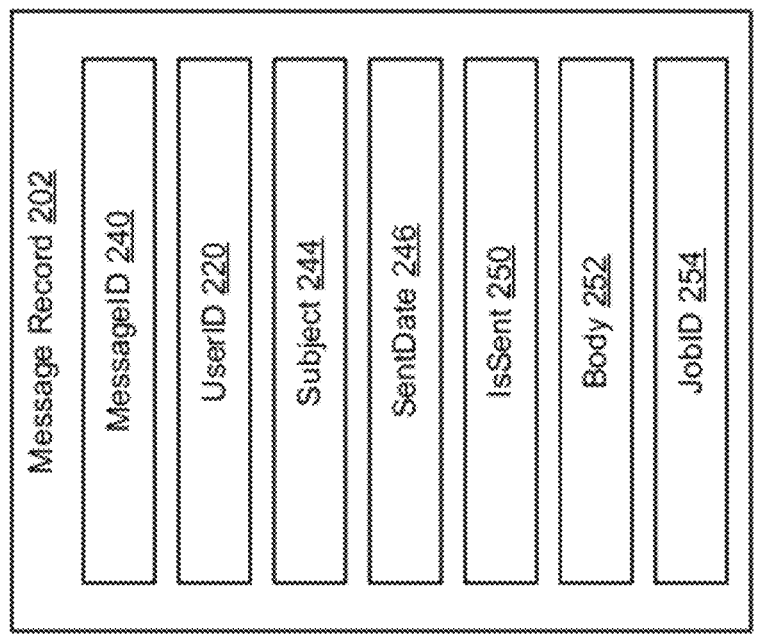
Figure 2B:
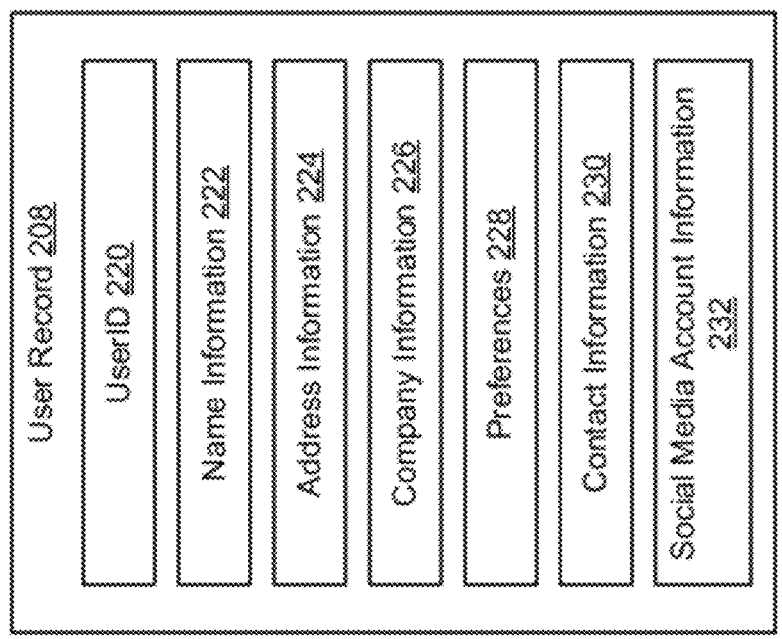

FIG. 2B shows a user record (208) is accordance with one or more embodiments of the invention. Each user record is associated with an individual. The individual may be a job candidate and/or a referring-entity. Each user record (208) may include one or more of the following fields: (i) UserID (220) configured to store a unique numeric, alpha, or alphanumeric value to uniquely identify the user within the system; (ii) name information (222) configured to store the name of the user; (iii) address information (224) configured to store the current physical address of the user; (iv) company information (226) configured to store the company at which the user is current employed; (v) preferences (228) configured to store various user preferences related to how the user prefers to interact with the various portions of the system (e.g., the user prefers to receive job messages and/or broadcast job messages over e-mail, etc.); (vi) contact information (230) configured to store the user's contact information, e.g., e-mail address(es), phone number, etc.; and (iv) social media account information (232) configured to store social media account information for the user, e.g., FACEBOOK username and password, handle, etc. Those skilled in the art will appreciate that in any given user record (208) one or more of the aforementioned fields may not be completed.

Though not shown in FIG. 2B, one or more of the following pieces of information may be tracked for given user: (i) skills that the user has; (ii) educational information of the user including, e.g., educational institution, degrees, etc.; (iii) patents on which the user is listed as an inventor; (iv) recommends that the user has received from other users within the system and/or recommendations from individuals external to the system (e.g., individuals that do not have a corresponding user record; (v) work history information including, e.g., companies at which the user was employed, jobs held, tile of job, duration of each job held, location of each job, etc.

The aforementioned information may be located in the user record (208) or in another record (not shown) within a database operatively connected to the job applications service and/or another service shown in FIG. 1.

FIG. 2C shows a message record (202) is accordance with one or more embodiments of the invention. Each message record (202) corresponds to a unique message associated with a user and job. Each message record (202) may include one or more of the following fields: (i) MessageID (240) configured to store a unique numeric, alpha, or alphanumeric value to uniquely identify the message within the system; (ii) UserID (220) configured to store the UserID of the user which sent the message; (iii) Subject (244) configured to store the subject line of the message (e.g., subject line of an e-mail); (iv) SentDate (246) configured to store the date the message was sent; (v) is Sent configured to store a Boolean value to indicate whether the message was sent; (vi) Body (252) configured to store the body/content of the message; and (vii) JobID (254) configured to store the JobID of the job that is associated with the message (see FIG. 2D for additional detail). Those skilled in the art will appreciate that in any given message record (202) one or more of the aforementioned fields may not be completed.

Figure 2D:
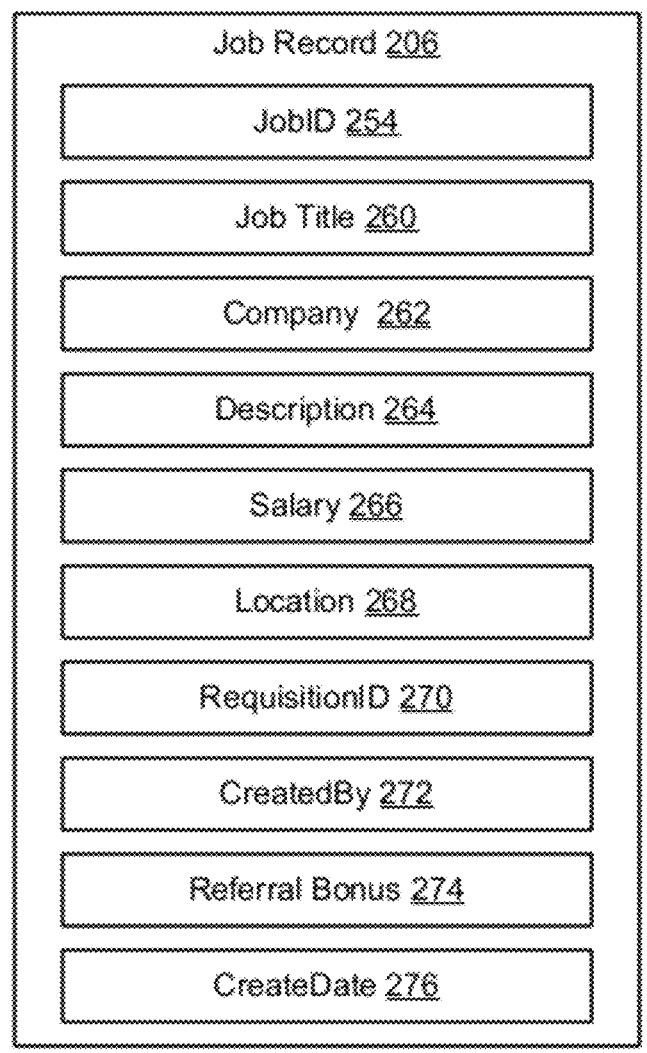

FIG. 2D shows a job record (206) is accordance with one or more embodiments of the invention. Each the job record (206) uniquely identifies a job within the system. Each job record (206) may include one or more of the following fields: (i) JobID (254) configured to store a unique numeric, alpha, or alphanumeric value to uniquely identify the job within the system; (ii) JobTitle (260) configured to store the title of the job; (iii) Company (262) configured to store the company that is offering the job; (iv) Description (264) configured to store the description of the job; (v) Salary (266) configured to store the salary of the job; (vi) Location (268) configured to store the location of the job, e.g., the city, state, and/or country in which the job is located; (vii) RequisitionID (270) configured to store a numeric, alpha, or alphanumeric value to uniquely identify the job from the perspective of the company offering the job; (viii) CreatedBy (272) configured to store the UserID of the user that created the job record (206); (ix) Referral Bonus (274) configured to store whether there is a referral bonus associated with the job and/or the amount of the referral bonus; and (x) CreateDate (276) configured to store the date on which the job record was created. Those skilled in the art will appreciate that in any given job record (206) one or more of the aforementioned fields may not be completed.

Figure 2E:
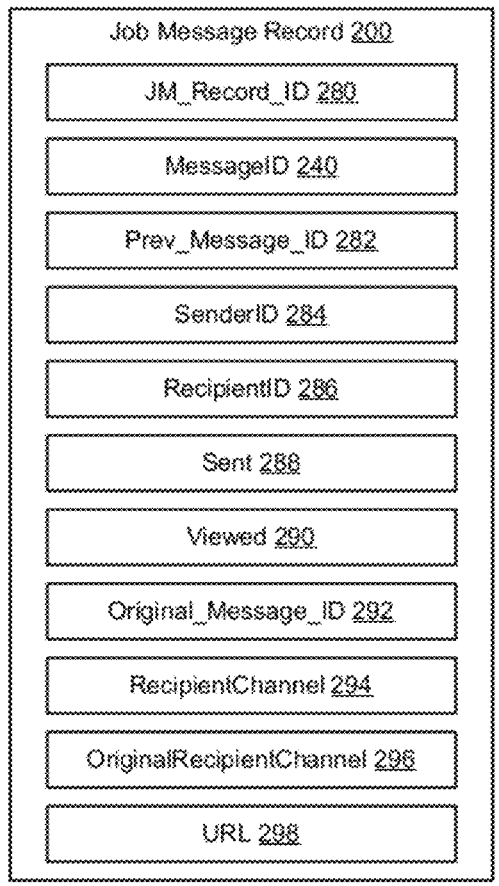

FIG. 2E shows a job message record (200) is accordance with one or more embodiments of the invention. Each job message record is associated with a job message. Each job message is uniquely associated with a job (via a message record), a sender, a recipient, and a communication channel. Each job message record (200) may include one or more of the following fields: (i) JM_Record_ID (280) configured to a unique numeric, alpha, or alphanumeric value to uniquely identify the job message record within the system; (ii) MessageID (240) configured to store the messageID corresponding to the message that is being sent with the job message; (iii) Prev_Message_ID (282) configured to store the message ID of the previously sent message within the job referral path (see FIGS. 6A-6B for additional details), (iv) senderID (284) the UserID of the user that is sending the job message; (v) RecipientID (286) the UserID of the user that is the intended recipient of the job message; (vi) Sent (288) configured to store a timestamp of when the job message was sent; (vii) Viewed (290) configured to store when the website specified in the URL (298) was requested; (viii) Original_Message_ID (292) configured to store the message ID of the original message within the job referral path (see FIGS. 6A-6B for additional details); (ix) RecipientChannel (294) configured to store the communication channel (e.g., e-mail) over which the job message is to be communicated to the recipient; (x) OriginalRecipientChannel (296) configured to store the original communication channel over which the original job message within the job referral path was communicated to the original recipient; and (xi) URL (298) configured to store a URL that is uniquely associated with the job message (as defined by the job message record). Those skilled in the art will appreciate that in any given job message record (200) one or more of the aforementioned fields may not be completed.

Figure 2F:
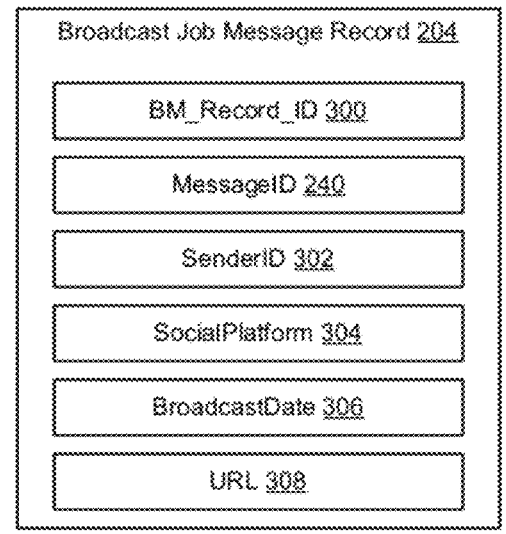

FIG. 2F shows a broadcast job message record (204) is accordance with one or more embodiments of the invention. Each broadcast job message record is associated with a broadcast job message. Each broadcast job message is uniquely associated with a job (via a message record), a sender, and a communication channel. Each broadcast job message record (204) may include one or more of the following fields: (i) BM_Record_ID (300) configured to store a unique numeric, alpha, or alphanumeric value to uniquely identify the broadcast job message record within the system; (ii) a MessageID (240) configured to store the messageID corresponding to the message that is being sent with the broadcast job message; (iii) SenderID (302) configured to store the userID of the user that is sending the broadcast job message; (iv) Socialplatform (304) is configured to store the identify of the social network and/or broadcast communication channel over which the broadcast job message is sent; (v) Broadcast Date (306) is the date on which broadcast job message was sent; and (vi) URL (308) configured to store a URL that is uniquely associated with the broadcast job message (as defined by the broadcast job message record). Those skilled in the art will appreciate that in any given broadcast job message record (204) one or more of the aforementioned fields may not be completed.

Figure 2G:
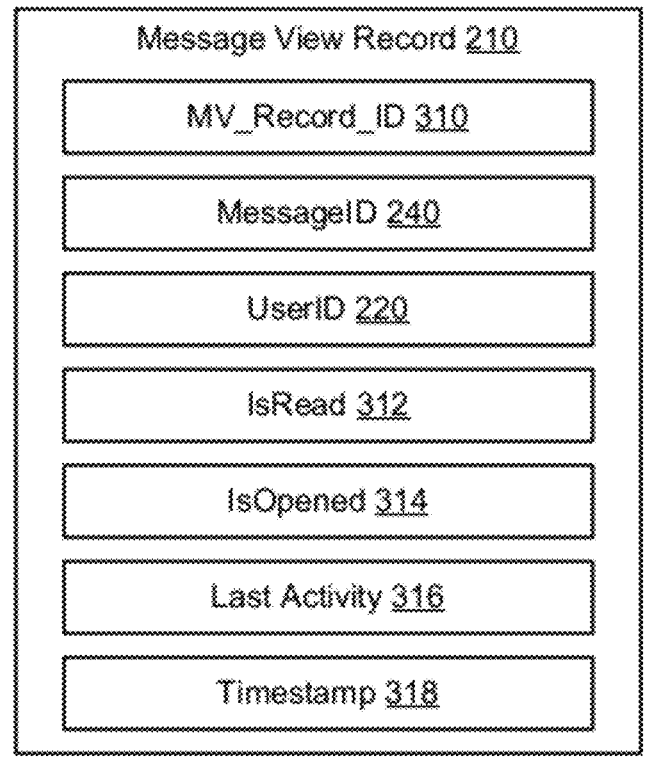

FIG. 2G shows a message view record (210) is accordance with one or more embodiments of the invention. The message view records (210) are configured to track a user's interaction with a job message or a broadcast job message. Each message view record (210) is uniquely associated with a job message and user. Accordingly, if a user receives a job message and a broadcast job message for the same job and the user viewed both the job message and the broadcast job message, there would be two message view records. Each message view record (210) may include one or more of the following fields: (i) MV_Record_ID (310) configured to store a unique numeric, alpha, or alphanumeric value to uniquely identify the message view record within the system; (ii) MessageID configured to store the messageID corresponding to the message being view; (iii) UserID (220) configured to store the userID of the user that viewed the message; (iv) IsRead (312) a Boolean value configured to indicate whether the user read the message; (v) IsOpened (314) a Boolean value configured to indicate whether the user opened the message; (vi) Last Activity (316) configured to store the last activity the user performed on the message (e.g., opened, read, forwarded, apply for job, etc.); and (vii) Timestamp (318) configured to store the timestamp of the last activity. Those skilled in the art will appreciate that in any given message view record (204) one or more of the aforementioned fields may not be completed.

FIGS. 3A-3D show flowcharts in accordance with one or more embodiments of the invention. While the various steps in the following flowcharts are presented and described sequentially, one of ordinary skill will appreciate that some or all of the steps may be executed in different orders, may be combined, or omitted, and some or all of the steps may be executed in parallel.

FIG. 3A shows a method for sending a job message or a broadcast job message in accordance with one or more embodiments of the invention. In one embodiment of the invention, the job message service is configured to performed one or more of the steps shown in FIG. 3A. Turning to FIG. 3A, in step 300 a user (i.e., the user the creates the initial job message or broadcast job message in the job referral path) selects a job. Those skilled in the art will appreciate that the job may be selected from a previously populated list of jobs (with corresponding job records (discussed above)) or that the user may create a new job (by creating a corresponding job record) and then select the new job.

In step 302, the target for the job is selected. In one embodiment of the invention, the user selects a job candidate, a referral-entity, or a group of job candidates or referral-entities (e.g., all individuals following the user's TWITTER feed, all graduates of a particular university, all individuals with a particular skill set living in a particular area, etc.). In one embodiment of the invention, the job message service is configured to provide recommendations of targets to the user. In one embodiment of the invention, the job message service may recommend an employee of the company that is offering the job as a target. Such a recommendation may be based on, for example, (i) employee's past activities with respect to forwarding job messages/broadcast job messages, e.g., employee has previously forwarded job messages/broadcast job messages they have received, employee has previously forwarded job messages/broadcast job message to job candidates that have applied for the job; (ii) employee's social network, e.g., employee has large social network, employee has social network with job candidates that are a good match for the job, etc.; and (iii) employee's relationship to a job candidate, e.g., went to the same university (or other educational institution), job candidate is in social network of the employee, etc. Those skilled in the art will appreciate that the employee recommendation, as described above, is used to identify employees that can act as referral-entities.

In one embodiment of the invention, the job message service may recommend a recruiter. Such a recommendation may be based on, for example, (i) recruiter's past activities with respect to forwarding job messages/broadcast job messages, e.g., recruiter has previously forwarded job messages/broadcast job messages they have received, recruiter has previously forwarded job messages/broadcast job message to job candidates that have applied for the job; (ii) recruiter's social network, e.g., recruiter has large social network, recruiter has social network with job candidates that are a good match for the job, etc.; and (iii) recruiter's relationship to a job candidate, e.g., went to the same university (or other educational institution), job candidate is in social network of the employee, etc. Those skilled in the art will appreciate that the recruiter recommendation, as described above, is used to identify recruiter that can act as referral-entities.

In one embodiment of the invention, the user may also receive a recommendation based on their own social network contacts (e.g., FACEBOOK friends, LINKEDIN connections, TWITTER followers, TWITTER feeds user is following, etc.).

Such a recommendation may be based on, for example, (i) social network contact's past activities with respect to forwarding job messages/broadcast job messages, e.g., social network contact has previously forwarded job messages/broadcast job messages they have received, social network contact has previously forwarded job messages/broadcast job message to job candidates that have applied for the job; (ii) size of social network contact's social network; (iii) social network contact's relationship to a job candidate, e.g., went to the same university (or other educational institution), job candidate is in social network of the employee, etc; (iv) social network contact being a good match for the job based on the location of the job; (v) social network contact being a good match for the job based on the title of the job and the social network contact's current job title; and/or (vii) social network contact being a good match for the job based on the job description and the social network contact's current skill set (as determined using, for example, social network contact's profile on one or more social networks).

Those skilled in the art will appreciate that recommendations of employees and/or social network contacts in step 302 may be based on information obtained from one or more of the databases shown in FIG. 1. Further, those skilled in the art will appreciate that a service other than the job message service may be configured to provide recommendations of the targets to the user without departing from the invention.

Continuing with FIG. 3A, in step 304, the communication channel over which to communicate the job message (corresponding to the job) is selected. If the target is a job candidate or a referral-entity, then communication channel may be a direct communication channel. If the target is a group of job candidates or referral-entities, then the communication channel may be broadcast communication channel. In one embodiment of the invention, the channel selection service (109 in FIG. 1) recommends a particular communication channel(s) over which to send the job message/broadcast job message to the target. In another embodiment of the invention, the channel selection service automatically selects the particular communication channels(s) over which to send the job message/broadcast job message to the target. Additional details about the channel selection service are described in FIG. 3B.

In step 306, a unique URL is generated. In step 308, the URL generated in step 306 is associated with a sender (i.e., the user that is sending the job message), the job (as defined in the corresponding job record), and the communication channel. Further, if the job is sent in a job message (as opposed to broadcast job message), then the URL is also associated with the target.

In step 310, a web page for the job is generated. In one embodiment of the invention, the content for the web page is at least, in part, obtained from the corresponding job record. The website is then associated with the URL generated in Step 306. In step 312, the job message or broadcast job message is generated (depending on the target selected in Step 302 and/or the communication channel selected in Step 304). In one embodiment of the invention, generating the job message includes generating the corresponding records (as described in FIGS. 2A-2G). For example, when a job message is generated, then a corresponding message record and job message record are also generated (typically prior to the generation of the job message). Similarly, when a broadcast job message is generated, then a corresponding message record and broadcast job message record are also generated (typically prior to the generation of the job message). Those skilled in the art will appreciate other records associated with the job message and or broadcast job message record may also be generated prior to generation of the job message or broadcast job message. Such records include the user record(s) and the job records. Continuing with FIG. 3A, in step 314, the job message or the broadcast job message are sent over the communication channel selected in Step 304. Those skilled in the art will appreciate that Steps 302-314 may be repeated if the user wishes to send a job message or job broadcast message to different job candidates, referral-entities, or groups of job candidates or referral-entities.

In one embodiment of the invention, when a job message or broadcast job message for a job is sent to a target, job messages and/or broadcast job messages may be automatically generated and sent to: (i) all employees of the company that is offering the job; (ii) a subset of employees of the company that is offering the job (e.g., all employees in a department, all employees in a location, all employees in a region, another defined subset of employees, or any combination thereof); or (iii) specific employees of the company.

FIG. 3B shows a method for selecting a channel in accordance with one or more embodiments of the invention. In step 350, the channel selection type is determined. In one embodiment of the invention, the channel selection type is one of: (i) group and (ii) individual. In one embodiment of the invention, the channel selection type of "group" is used in scenarios in which no particular individual has been identified. For example, the target may be all graduates of a particular educational institution, all software engineers in a geographic location, all software engineers (regardless of geographic location), all readers of a particular blog, etc.

In step 352, a determination is made about whether the channel selection type is a group. If so, the process proceeds to Step 354; otherwise the process proceeds to step 358. In step 354, the characteristics of the group are obtained. In one embodiment of the invention, the characteristics define the group. In one or more embodiments of the invention, the characteristics of the group may include, but are not limited to, current job title, past job title, current geographic location, education institution(s) attended, years of experience of a particular job, education level, any other characteristics that define the group, or any combination thereof.

In step 358, the analytics information corresponding to the characteristics is obtained. In one embodiment of the invention, the analytics information corresponds to data generated by the analytics engine based on analyzing the records in the message data, the jobs database, and/or the user database. For example, the analytics engine may obtain the necessary records from the aforementioned database to determine: (i) which communication channel(s) was most effective for a particular job (as identified by a JobID); (ii) determine which communication channel(s) was most effective for a particular type of job (e.g., software engineer) using records associated with different JobIDs but that are all related to the same type of job; (iii) determine what communication channel(s) a given user prefers based on prior actions by the user with respect to job message/broadcast messages received over various communication channels; and (iv) what communication channel(s) a given type/group of user prefers.

In one embodiment of the invention, the analytics engine is configured to receive the request and generate appropriate database queries (using known database query languages, e.g., SQL, JQL, etc.) to the various databases shown in FIG. 1 to obtain the appropriate records required to generate the analytics information. Upon receipt of the appropriate records, the analytics engine generates the analytics information using known data aggregation techniques and sends the analytics information to the channel selection service. The process then proceeds to step 362.

In step 358, the channel selection type is for an individual, accordingly, the characteristics of the individual are obtained. In one embodiment of the invention, the characteristics define the individual. In one or more embodiments of the invention, the characteristics of the individual may include, but are not limited to, current job title, past job title, current geographic location, education institution(s) attended, years of experience of a particular job, education level, any other characteristics that define the individual, or any combination thereof.

In step 360, the analytics information corresponding to the characteristics is obtained. In one embodiment of the invention, the analytics information corresponds to data generated by the analytics engine based on analyzing the records in the message data, the jobs database, and/or the user database. For example, the analytics engine may obtain the necessary records from the aforementioned database to determine: (i) what communication channel(s) a given user prefers based on prior actions by the user with respect to job message/broadcast messages received over various communication channels; and (ii) what communication channel(s) a given type/group of user prefers.

In one embodiment of the invention, the analytics engine is configured to receive the request and generate appropriate database queries (using known database query languages, e.g., SQL, JQL, etc.) to the various databases shown in FIG. 1 to obtain the appropriate records required to generate the analytics information. Upon receipt of the appropriate records, the analytics engine generates the analytics information using known data aggregation techniques and sends the analytics information to the channel selection service. The process then proceeds to step 362.

In step 362, one or more communication channels are identified based on the analytics information. In one embodiment of the invention, if the channel selection type is a individual and the individual has previously received a job message/broadcast job message, then channel selection service may more heavily weight the analytics information related to the individual's actual prior actions (e.g., read job description, forwarded job message/broadcast job message, applied for job) and may less heavily weight the analytics information related to the actual actions related to individuals that share the same characteristics as the individual (e.g., if the individual is a software engineer, then the analytics information for other software engineers may be considered). However, if the individual has not previously received a job message/broadcast job message, then the channel selection engine may only consider the analytics information related to the actual actions related to individuals that share the same characteristics as the individual (e.g., if the individual is a software engineer, then the analytics information for other software engineers may be considered).

In one embodiment of the invention, if the channel selection type is group, then the analytics information considered by the channel selection service may more rely on analytics related to individuals that are representative of the group that is the target of the job message/broadcast job message.

In one embodiment of the invention, the channel selection service may be based on the channel recommendation on (i) actual metrics such as an actual conversion rate (i.e., the percentage of individuals that receive a job message or broadcast job message, that apply for the job) if such data is available for the specific individual or group or (ii) projected metrics such as a projected conversion rate if no data for the specific individual or group is available. In one embodiment of the invention, the projected conversion rate is determined by (i) indentifying individuals or groups that are similar to the target individual or target group; (ii) determining the actual conversion rates for the individual or groups identified in (i); and (iii) determining a projected conversion rate by applying a similarity factor to the actual conversion rates, which is correlated to the similarity in characteristics of the target individual or target group to the individuals or groups indentified in (i).

In one embodiment of the invention, the channel selections service may provide a listing of effective communication channels as output in Step 362. In such cases, each communication channel may be ranked in order of conversion rates, where a higher rank communication channel has a higher conversation rate than a relatively lower ranked communication channel.

FIG. 3C shows a method for a user interacting with a job message or broadcast job message in accordance with one or more embodiments of the invention. Turning to FIG. 3C, in step 318, a job message or a broadcast job message is received. In the context of job messages, a job message may be considered to be received when it appears, for example, in an inbox of the target. In the context of broadcast job messages, a broadcast job message may be received when the broadcast job message is, for example, posted on FACEBOOK wall, posted on a blog, or published in a TWITTER feed.

In step 320, the link in the job message or broadcast job message is selected (or clicked) by the target (or another entity that has received the job message or broadcast job message). For example, the intended target may have forwarded the job message or broadcast job message in a manner that is not tracked by the referral tracking system.

In step 322, the web page associated with the URL within the link is presented in the web browser (or another application capable of presenting web pages) for the individual that selected the link to view in Step 320. In one embodiment of the invention, the referral tracking service includes functionality to obtain the web page based on the URL within the link. In one embodiment of the invention, a message view record is created for each user that views the web page. Further, the message view record may be created and/or updated by the job referral service.

In step 324, a determination is made about whether the individual viewing the web page wishes to forward a job message or broadcast job message to a job candidate, a referral-entity, a group of job candidates or referral-entities, or any combination thereof. If the individual viewing the web page wishes to forward a job message or broadcast job message, the process proceeds to Step 302 in FIG. 3A; otherwise the process proceeds to step 326. In one embodiment of the invention, if the individual viewing the web page wishes to forward a job message or broadcast job message the corresponding message view record is updated to reflect that the user's last activity, namely, generating a job message or broadcast job message.

In one embodiment of the invention, the process proceeds to from step 324 to Step 302, the individual that is forwarding the message may be presented with recommendations for their social network contacts (as described above) and/or presented with employee recommendations (as described above). Those skilled in the art will appreciate that the social network recommendations are based on the social network(s) of the individual that is forwarding the message. Similarly, the employee recommendations are for employees of the individual's company (i.e., the company at which the current individual works).

Continuing with FIG. 3C, in step 326, a determination is made about whether the target (or another entity that has received the job message or broadcast job message) has indicated (via selection of a link in web page) that they wish to apply for the job (i.e., the job in the job message or broadcast job message). If so, the process proceeds to step 328; otherwise the process ends. In step 328, the target (or another entity that has received the job message or broadcast job message) is re-directed to a job application page. In one embodiment of the invention, the job application page (and related functionality) is provided by the job application service. Once at the job application page, the target (or another entity that has received the job message or broadcast job message) may apply for the job.

Figure 3D:
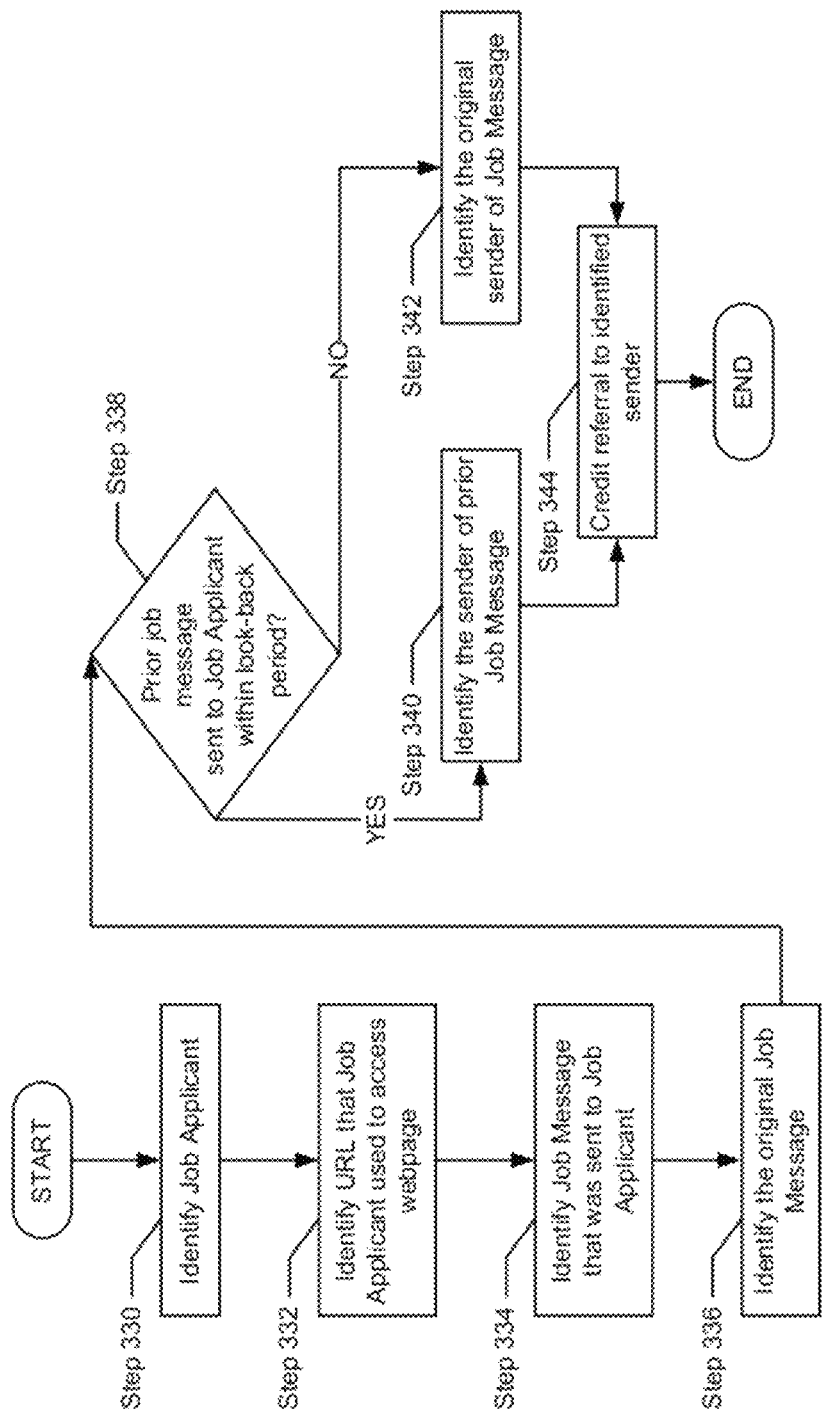

FIG. 3D shows a method for determining a source of a referral in accordance with one or more embodiments of the invention. In one embodiment of the invention, the referral tracking service is configured to perform one or more of the steps shown in FIG. 3D.

Turning to FIG. 3D, in step 330, the job applicant is identified. In one embodiment of the invention, the job applicant is identified using the UserID associated with the job applicant. In Step 332, the URL that the job applicant used to access the web page that included that link to the job application web page is identified. In one embodiment of the invention, the URL may take the job applicant directly to the job application web page. In such cases, in step 332, the URL that the job applicant selected to navigate to the job application web page is identified.

In Step 334, the job message or broadcast job message that was sent to the job applicant is identified. In one embodiment of the invention, the job application service queries the message database to identify the job message or broadcast job message that includes the URL.

In Step 336, the original job message or original broadcast job message is identified. In one embodiment of the invention, the original job message is identified using the Original_Message_ID field in the job message record corresponding to the job message identified in Step 334. In one embodiment of the invention, the original broadcast job message is identified by viewing one or more broadcast job message records and one or more message view records to identify the original job message or original broadcast job message.

In Step 338, a determination is made about whether a prior job message or prior broadcast job message was sent to the job applicant within a look-back period. If so, the process proceeds to step 340; otherwise, the process proceeds to step 342. In one embodiment of the invention, the prior job message or prior broadcast job message corresponds to a job message or broadcast job message for a different job with the same company as the job for which the job applicant applied that was sent from a different sender prior to the job message or broadcast job message (as identified in step 334) being sent to the job applicant.

In one embodiment of the invention, the look-back period corresponds to a sliding window of time that precedes the receipt of the job message or broadcast job message (as identified in step 334). The look-back period may be defined in days, months, years, or a combination thereof. Further, the look-back period may be set by the company offering the job, the job referral service, a third-party, or any combination thereof.

Continuing with FIG. 3D, in Step 340, the sender of the prior job message or prior broadcast job message is identified. In Step 342, the sender is identified from the original job message or original broadcast job message (as identified in step 336). In Step 344, the identified sender (either from step 340 or 342) is credited with the referral of the job applicant. Those skilled in the art will appreciate that if the sender credited with the referral may be an employee of the company that associated with the job for which the applicant applied or may be third-party (e.g., a recruiting agency, an individual, etc.).

The following section describes various examples of various embodiments of the invention. The examples are included for purposes of illustration and are not intended to limit the scope of the invention.

FIGS. 4A-4G show screenshots of graphical user interfaces used to generate a job message or broadcast job message. As shown in FIGS. 4A-4G, the job message and broadcast job messages may be referred to as Jobvites.

Figure 4A:
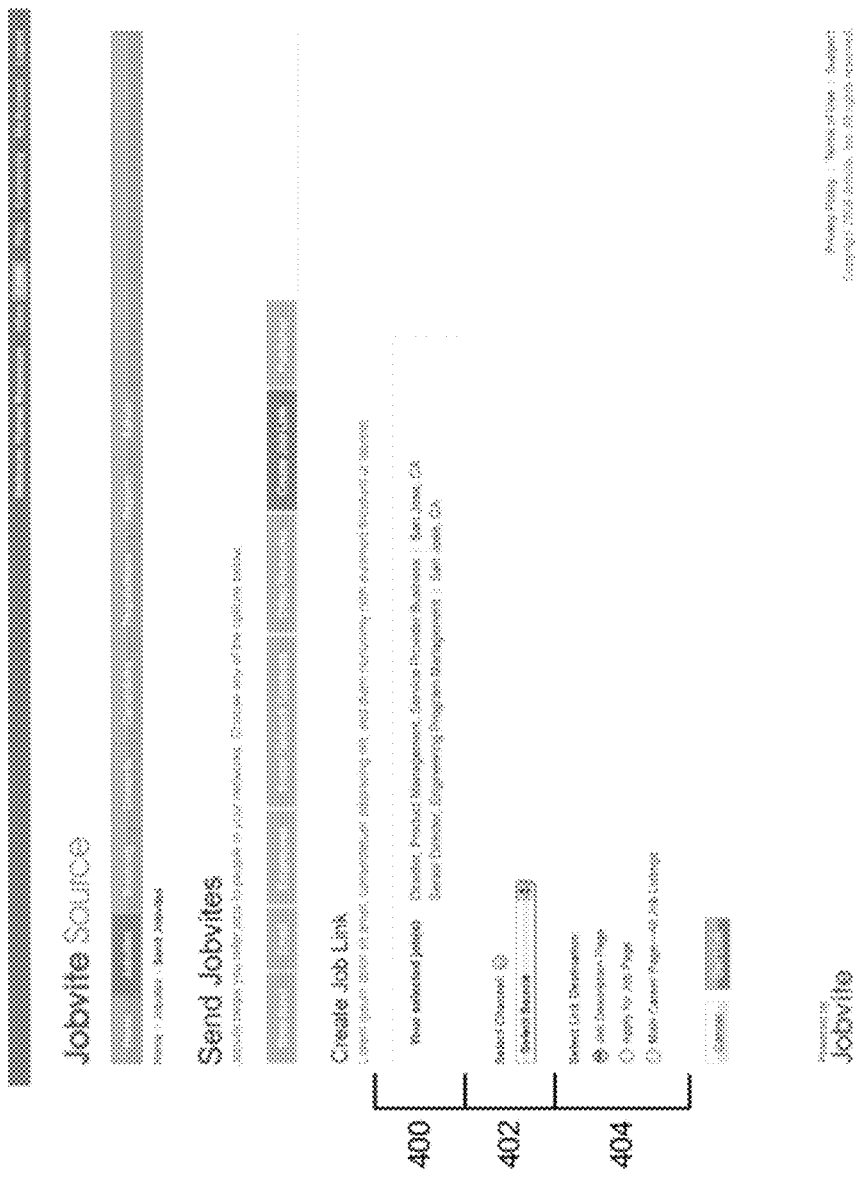
FIG. 4A-4G show example screenshots in accordance with one or more embodiments of the invention.

Referring to FIG. 4A, FIG. 4A shows a screenshot of a graphical user interface for creating a job message or a broadcast job message. The GUI lists the jobs (400) for which job messages or broadcast job messages are to be created. Further, the GUI allows a user to select the communication channel (402) over which the job message or broadcast job message will be communicated. Finally, the GUI allows the user to select the web page (404) that will be associated with the job message or broadcast job message. In one embodiment of the invention, the aforementioned web page is associated with the URL generated in step 306 in FIG. 3A and the web page corresponds to the web page in step 310. Those skilled in the art will appreciate that depending on which web page is associated with the URL, the web page may or may not be required to be generated in step 310. Once the user inputs the requested information into the GUI, the job message service is configured to generate a unique URL which may be manually included in a message communicated over the selected communication channel. The URL credited in FIG. 4A, may be referred to as a JobLink.

Figure 4B:
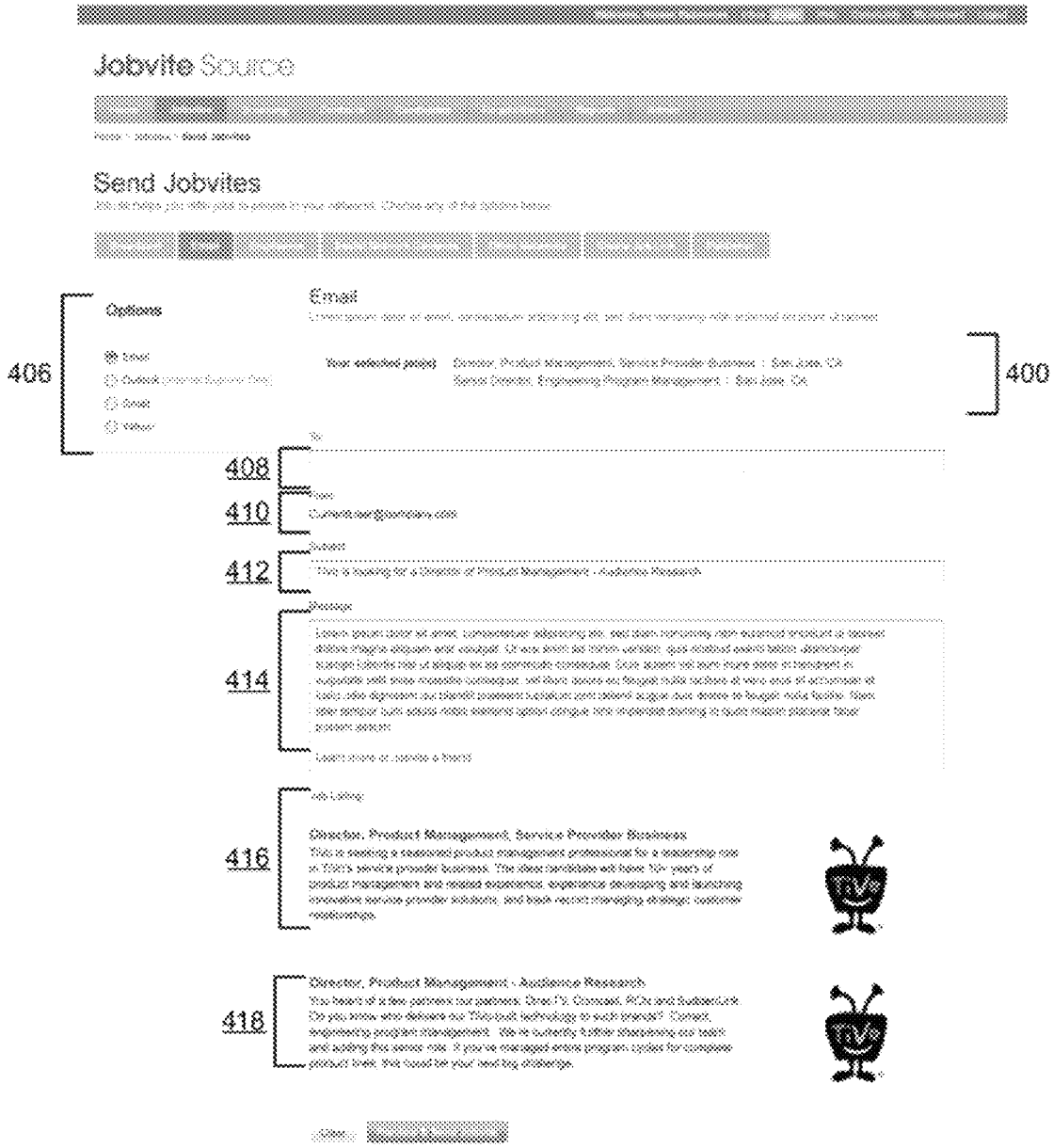

FIG. 4B shows a screenshot of graphical user interface for creating a job message to be sent over e-mail. The GUI lists the jobs (400) for which job messages or broadcast job messages are to be created. Further, the GUI allows the user to select email addresses or sources of e-mail addresses (406) of targets for the job message. The GUI also includes the following fields for the job message: (i) "To" (408) configured to show the currently selected e-mail addresses;

(ii) "From" (410) configured to show the e-mail address of the sender of the job message; (iii) "Subject" (412) configured to list the subject of the job message (which in this example will be an e-mail); and (iv) "Message" (414) configured to include the message that will appear in the body of the job message (which in this example will be an e-mail). Finally, the GUI also includes additional detail (416, 418) about the jobs (400) for which job messages or broadcast job messages are to be created.

Figure 4C:
Figure 4C:

FIG. 4C shows a screenshot of graphical user interface for creating a job message to be sent over e-mail, where the targets of the job message are employees of the company that is posting the job. The GUI lists the jobs (400) for which job messages or broadcast job messages are to be created. Further, the GUI allows the user to select email addresses of employees (420), which will be the targets of the job message. The employees may be filtered based on location of the employee and/or department of the company in which the employee works. The GUI also includes the following fields for the job message: (i) "Subject" (412) configured to list the subject of the job message (which in this example will be an e-mail) and (ii) "Message" (414) configured to include the message that will appear in the body of the job message (which in this example will be an e-mail). Finally, the GUI also includes additional detail (416, 418) about the jobs (400) for which job messages or broadcast job messages are to be created.

Figure 4D:
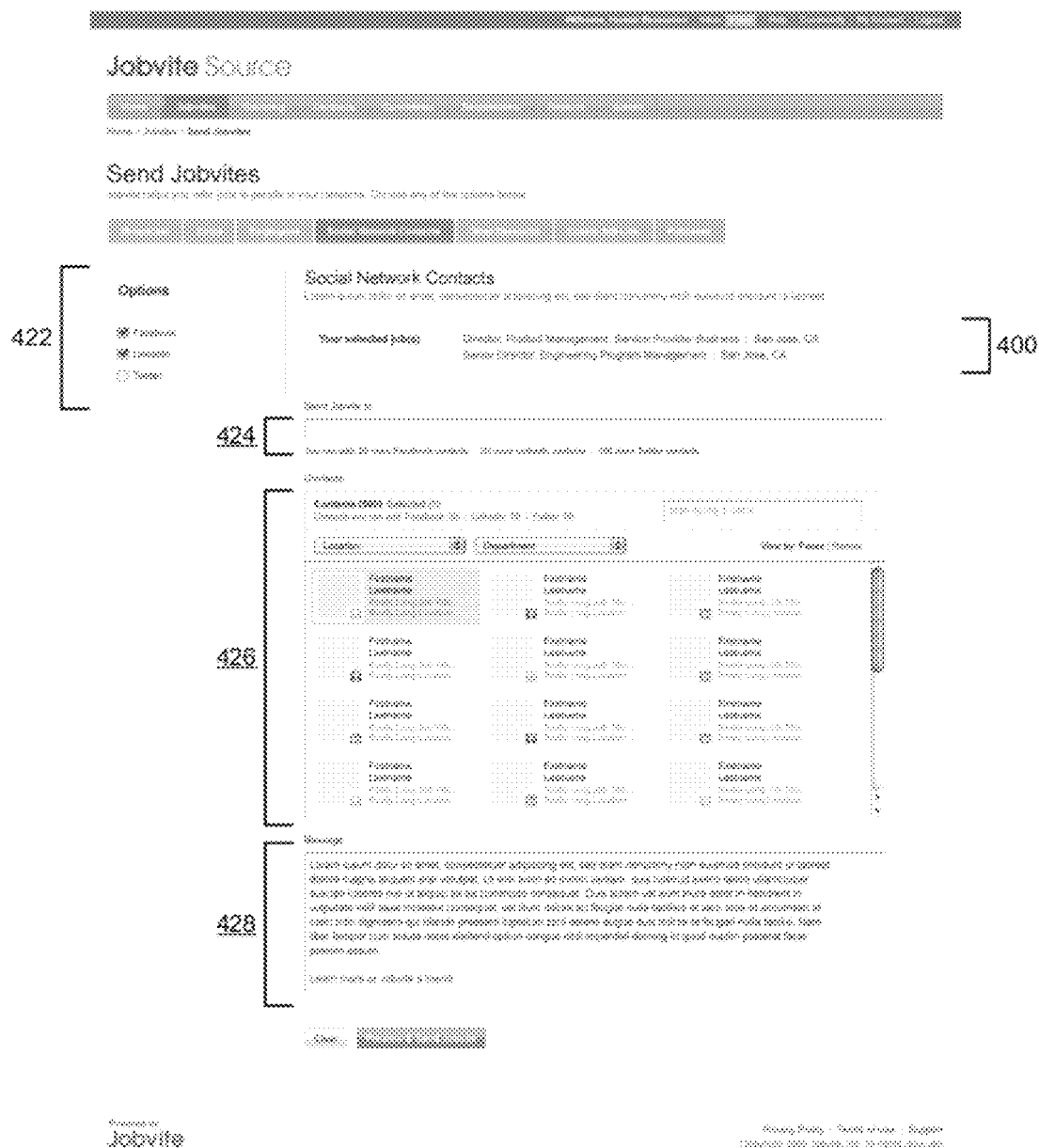

FIG. 4D shows a screenshot of graphical user interface for creating a job message to be sent via a social network. In the example shown in FIG. 4D, the social networks are used as direct communication channels. The GUI lists the jobs (400) for which job messages or broadcast job messages are to be created. The GUI allows the user to select the social network(s) (422) over which to send the job message. Further, the selection of the social network(s) also dictates the targets that are presented in the contacts panel (426) on the GUI. More specifically, the targets in the contacts panel (426) correspond to contacts in the selected social network(s). The GUI also includes the following fields for the job message: (i) "To" (424) configured to show the currently selected targets and (ii) "Message" (428) configured to include the message that will appear in the body of the job message.

Figure 4E:
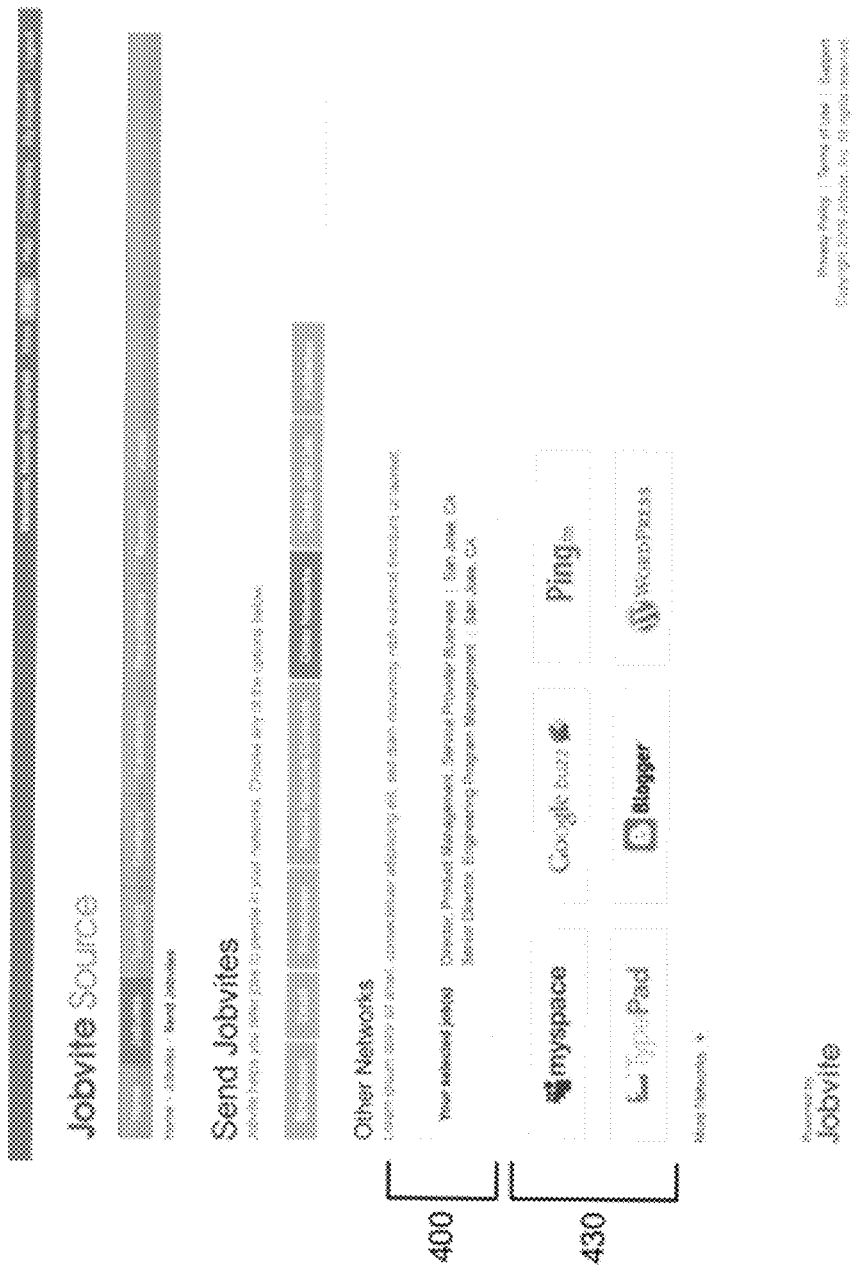

FIG. 4E shows a screenshot of graphical user interface for creating a job message to be sent via a network, such as a blog. The GUI lists the jobs (400) for which job messages or broadcast job messages are to be created. In addition, the GUI lists the (430) networks over which the job message or broadcast job message may be sent.

Figure 4F:

FIG. 4F shows a screenshot of graphical user interface for creating broadcast job messages. The GUI lists the jobs (400) for which job messages or broadcast job messages are to be created. The GUI also lists various broadcast communication channels (432) over which a broadcast job message may be sent. As shown in FIG. 4F, a broadcast job message may be sent using one or more of the following broadcast communication channels: (i) FACEBOOK status update (434); (iii) LINKEDIN update (436); (iii) TWITTER status update (438); (iv) FACEBOOK wall post (440); and (v) LINKEDIN Group Post (442).

Figure 4G:
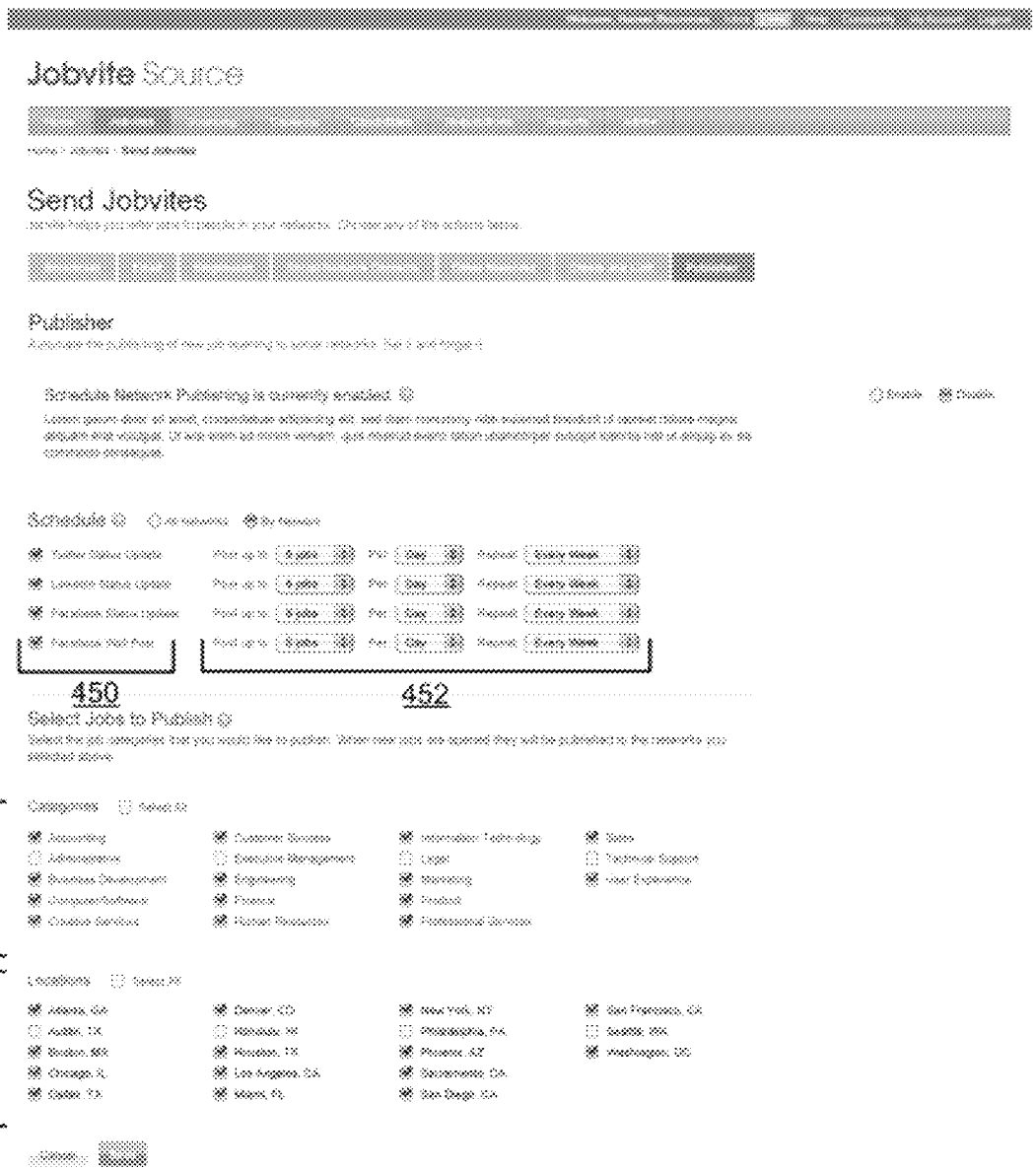

FIG. 4G shows a screenshot of graphical user interface for automatically creating broadcast job messages. The GUI allows the user to select one or more broadcast communication channels (450). For each selected broadcast communication channel (450), the user can specify the schedule (452) for generating and sending the broadcast job messages. Further, the user may select which jobs to send via broadcast job messages based on job category (454) and/or job location (456).

FIGS. 5A-5F show screenshots viewed by users, job candidates, and referral-entities as job messages and job broadcast messages are propagated across various communication channels. As shown in FIGS. 5A-5F, the job message and broadcast job messages may be referred to as Jobvites.

Figure 5C:
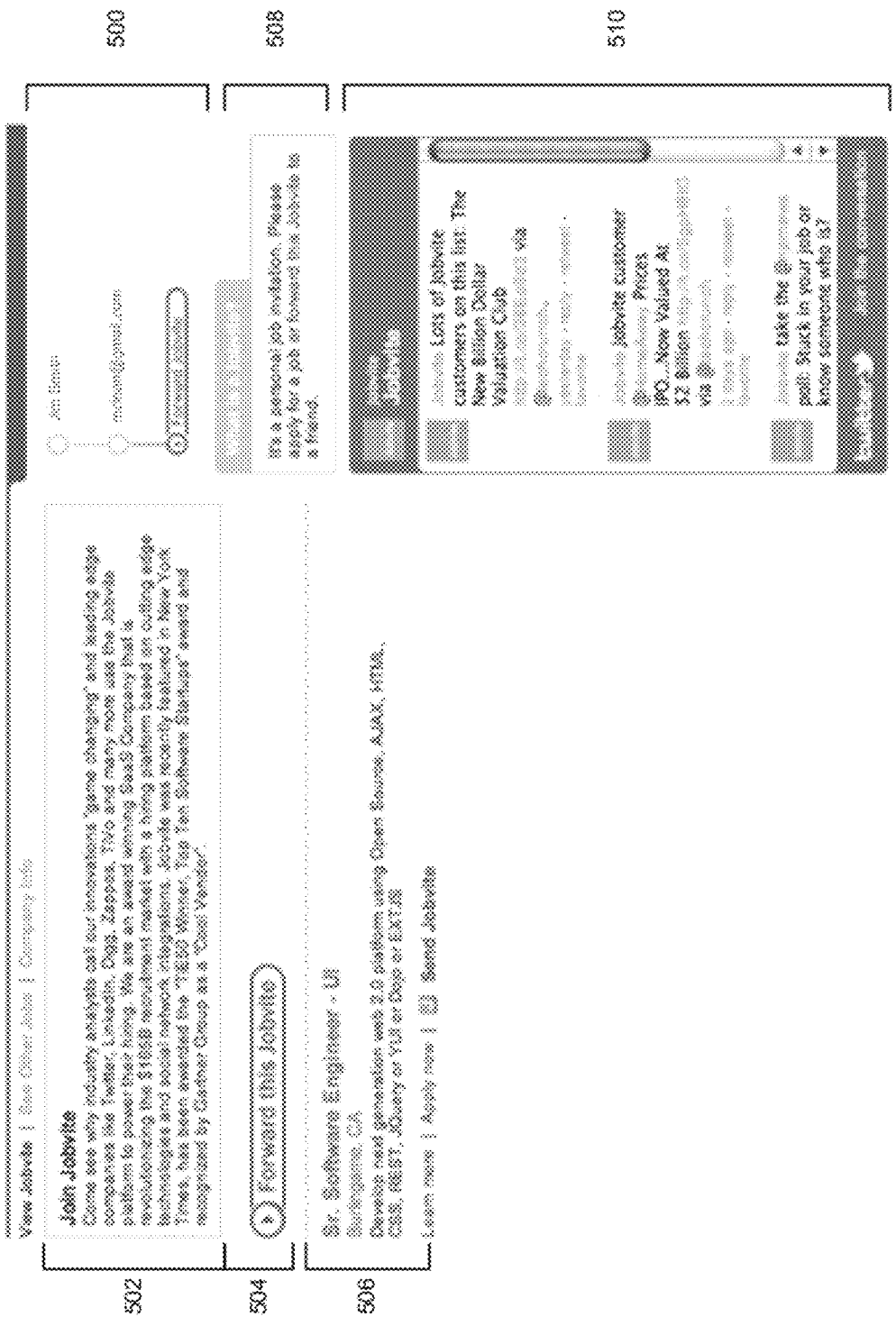

FIG. 5A shows an example of a job message in accordance with one or more embodiments of the invention. The job message identifies: (i) the sender, i.e., Jim Smith, (ii) the date the job message was sent; (iii) the target, i.e., Mary Mclean; (iv) the subject of the job message, i.e., "Jobvite is looking for a Sr. Software Engineer—UI"; (v) a message, i.e., "I thought you'd be interested in this job at Jobvite or know someone who might be good match."; (vi) a link(s) to the web page (see FIG. 5C) when the target selects "Learn more or Jobvite a friend"; (vii) a visual representation of at least part of a job referral path, i.e., Jim Smith>>mary_mclean@gmail.com; and (viii) a description of the job.

FIG. 5B shows a broadcast job message in accordance with one or more embodiments of the invention. More specifically, the broadcast job message is sent via a TWITTER status update. The broadcast job message includes: (i) a sender, i.e., adamhyder; (ii) a title of the job, i.e., "Software Engineer; (iii) a message, i.e., "Jobvite is looking for: Software Engineer"; and (iv) a URL to the web page (see e.g., FIG. 5C)

FIG. 5C shows a web page in accordance with one or more embodiments of the invention. The web page corresponds to the web page that is associated with the unique URL (which may be embedded in a link) within the job message (see FIG. 5A). The web page includes: (i) details about the company offering the job (502); (ii) a link to forward the job (504); (iii) detail about the job (506); (iv) a visual representation of the job referral path (500); (v) an explanation of a job message (508); and (vi) TWITTER feed (510) associated with the company offering the job. Those skilled in the art will appreciate that the TWITTER feed may be dynamically updated while Mary Mclean is viewing the web page.

In one embodiment of the invention, the visual representation of the job referral path corresponds to the shortest path between the original sender and the target of the job message (or broadcast job message) that is associated with the URL corresponding to the web page. For example, in FIG. 5C, the job referral path shows that the job message was sent from Jim Smith to mclean@gmail.com. This indicates that the shortest path from Jim Smith to mclean@gmail.com is a direct path. However, the job may have been forwarded via two different paths as follows: (i) Jim Smith Bob Jones Mary Mclean; and (ii) Jim Smith→Mary Mclean. Accordingly, because there is a direct path between Jim Smith and Mary Mclean, that is what is shown in the job referral path.

Figure 5D:
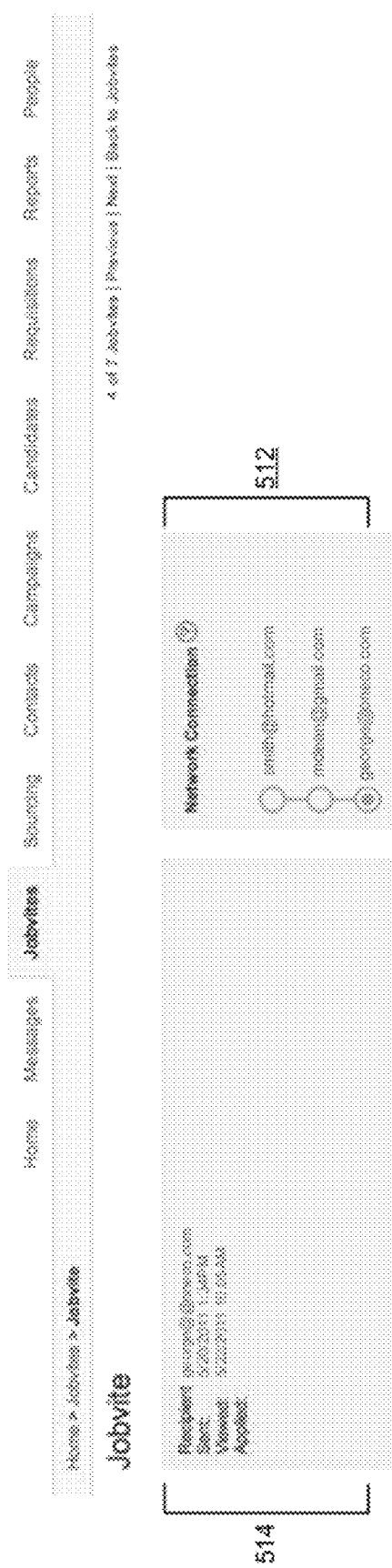

FIG. 5D shows a screenshot of graphical user interface for tracking the propagation of job. The GUI includes a visual representation of a job referral path (512), that is available to the user that sent the original job message (or broadcast job message) and/or to other individuals that are handling the hiring processes for a company. In this example, the visual representation of the job referral path indicates that a job message (or broadcast job message) was most recently sent to george@oneco.com. In addition, the GUI shows when George received the job message and when George viewed the job message (514).

Figure 5E:
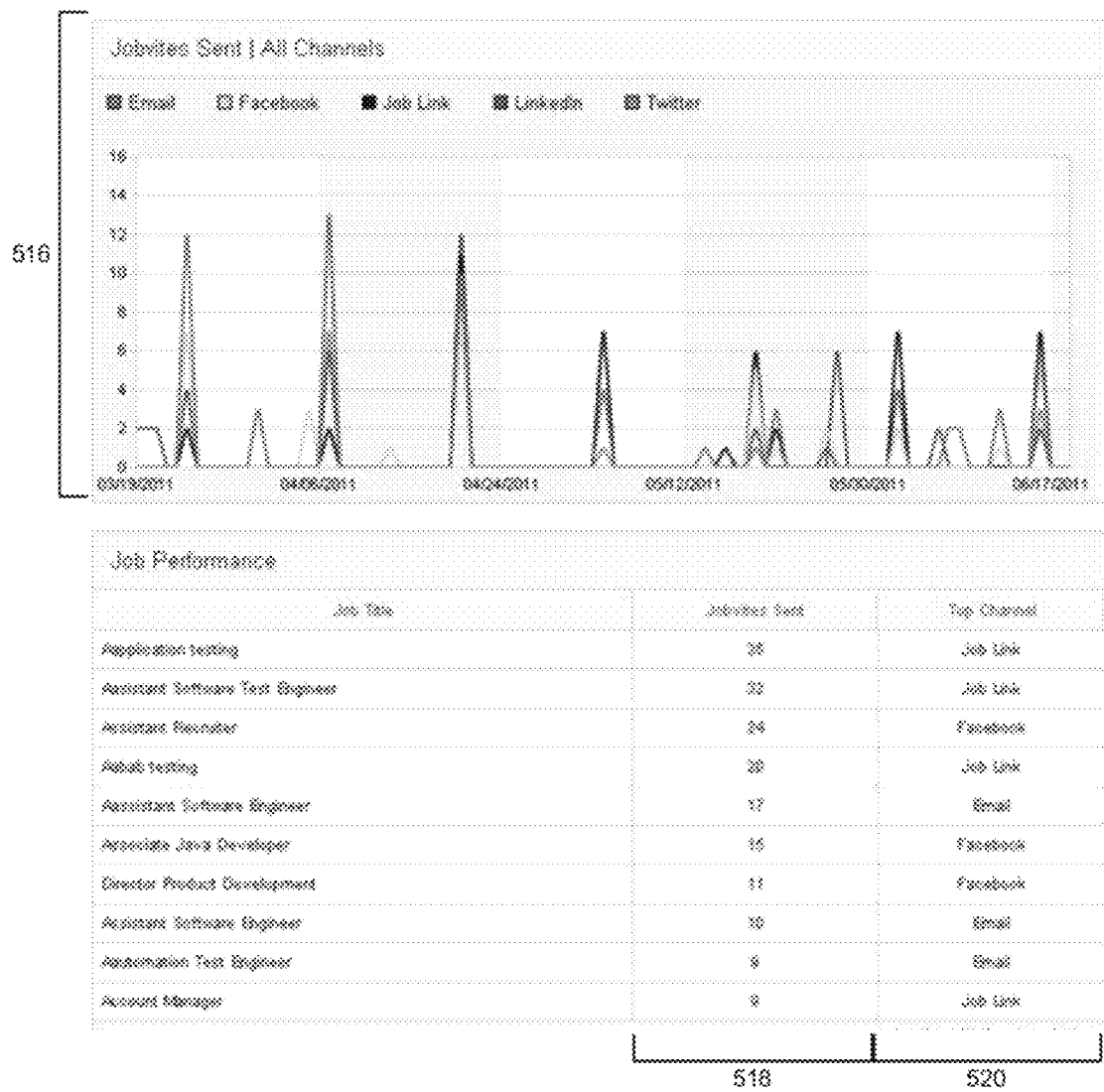
Figure 5F:
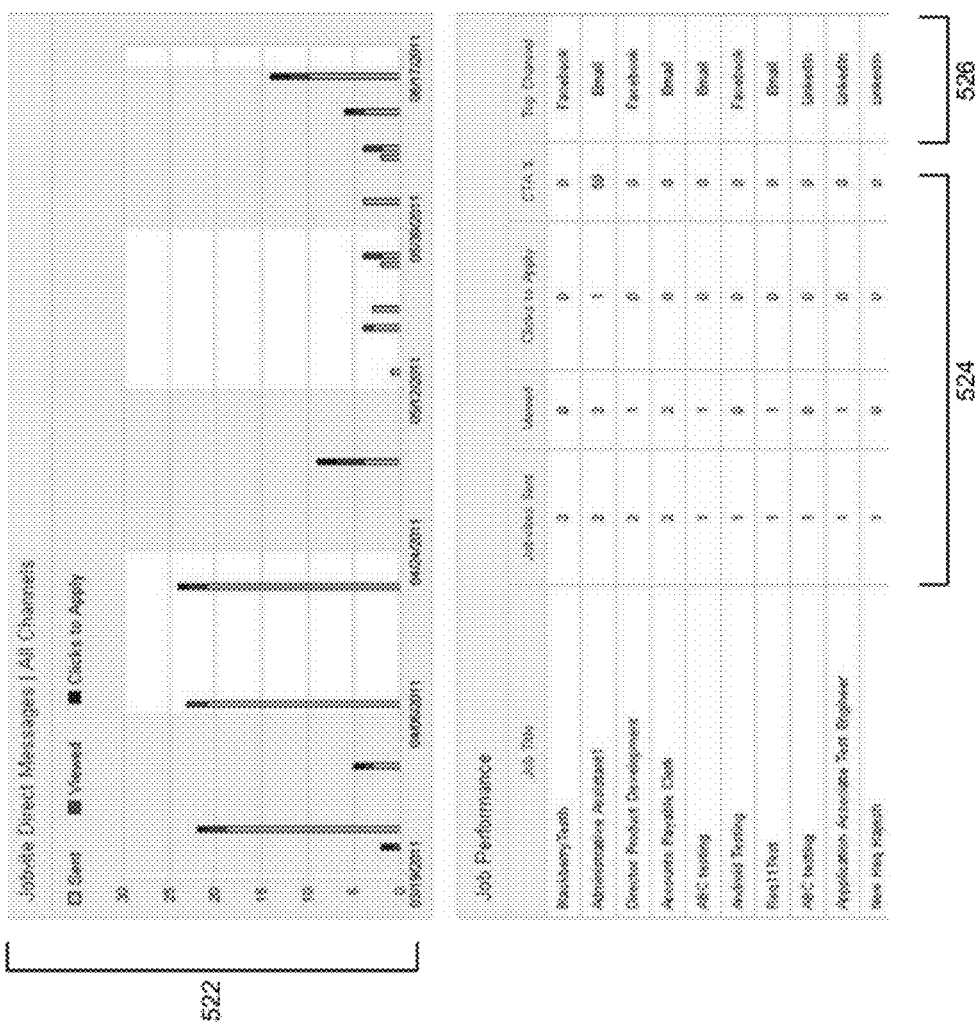

FIG. 5E shows a screenshot of a graphical user interface for reviewing analytics related to tracking how various communication channels are used. More specifically, as shown in the GUI, the referral tracking service and/or the analytics engine includes functionality to track how various jobs are referred to job candidates and referral-entities. For example, the GUI shows (i) when the various job messages and broadcast job messages were sent on a per communication channel basis (516) and (ii) detail breakdown on a per-job title basis about the number of job messages or broadcast job messages that were sent (518) and over which communication channel the most number of job messages or broadcast job messages were sent (520).

FIG. 5F shows a screenshot of a graphical user interface for reviewing analytics related to determining the effectiveness of various communication channels. More specifically, the GUI shows (i) when the various job messages were (522), (ii) detail breakdown on a per-job title basis how the various individuals interacted with the job message (viewed, clicks to apply (CTA), etc.) (524) and (iii) the most effective direct communication channel for each job (526).

Those skilled in the art will appreciate that other metrics may be extracted from the various databases including, but not limited to, (i) the most effective broadcast communication channel per-job; (ii) the employee with the most referrals; and (iii) when and how many job messages or broadcast job messages are sent each day on a per-job basis.

FIGS. 6A-6F show flow diagrams detailing examples of the propagation of job messages and broadcast job messages across various communication channels. For purposes of these examples, "S" and "S[number]" refers to a sender and "T[number]" refers to a target.

Figure 6A:
FIGS. 6A-6F show example flow diagrams in accordance with one or more embodiments of the invention.

Referring to FIG. 6A, S posts a broadcast job message via a TWITTER status update. T1, which subscribes to S's TWITTER feed selects the URL in the broadcast job message and subsequently views the corresponding web page (see e.g., FIG. 5C). T1, via the web page, "forwards" the job to T2. In this example, forwarding the job message may be initiated via the web page (see e.g., FIG. 5C) using the method shown in FIG. 3A. T2 subsequently receives the job message (via email) and applies for the job. Those skilled in the art will appreciate that the web page viewed by T1 is different that the web page viewed by T2. Specifically, the job referral path in each of the web pages will be different. Further, each web page will be associated with its own unique URL.

Figure 6B:
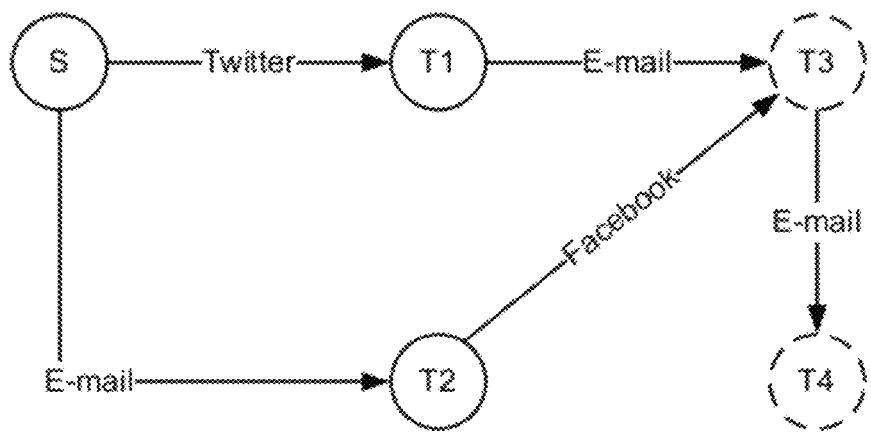

Referring to FIG. 6B, S sends a first job message to T1 and a second job message for T2. T1 subsequently forwards a third job message to T3 and T2 forwards a fourth job message to T3. Finally, T3 forwards a fifth job message to T4. T3 and T3 ultimately apply for the job. Those skilled in the art will appreciate that while FIG. 6B includes the sending of five different job messages, each of the job messages is associated with the same job.

In one embodiment of the invention, in the broadcast job message record for the first job message TWITTER is listed in the "socialplatform" field (see FIG. 2F). In the job message record for the second job message e-mail is listed in the "recipientchannel" field (see FIG. 2E). In the job message record for the third job message e-mail is listed in the "originalrecipientchannel" field and e-mail is listed in the "recipientchannel" field (see FIG. 2E). In the broadcast job message record for the fourth job message FACEBOOK wall post is listed in the "socialplatform" field (see FIG. 2F). In the job message record for the fifth job message TWITTER is listed in the "originalrecipientchannel" field and e-mail is listed in the "recipientchannel" field (see FIG. 2E).

In one embodiment of the invention, the job referral path is updated as the job is forwarded across the various communication channels. For example, (i) the web page viewed by T1 includes the following job referral path: S→T1; (ii) the web page viewed by T2 includes the following job referral path: S→T2; (iii) the web page viewed by T3 (from the job message sent by T2) includes the following job referral path: S→T2→T3 (assuming that the job message from T2 was sent to T3 before T1 sent the job message to T3); and (iv) the web page viewed by T4 (from the job message sent by T2) includes the following job referral path: S→T2→T3→T4. Those skilled in the art will appreciate that the job referral path, S→T2→T3→T4, would be the same regardless of whether T3 forwarded the second job message from T1 or the fourth broadcast job message from T2. However, the content of the job message record for the fifth job message would reflect a different "originalrecipientchannel" depending on whether T3 forwarded the second job message from T1 or the fourth broadcast job message from T2. The content of "originalrecipientchannel" for the fifth job message, as discussed above, assumes that T3 forwarded the second job message.

Those skilled in the art will appreciate that if T1 has sent the job message to T3 before T2, then the job referral path would be S→T1→T3→T4. In the examples shown in FIGS. 6A and 6B, S would be created with the referral of T2 (in FIG. 6A) and T3 and T4 (in FIG. 6B).

Figure 6C:
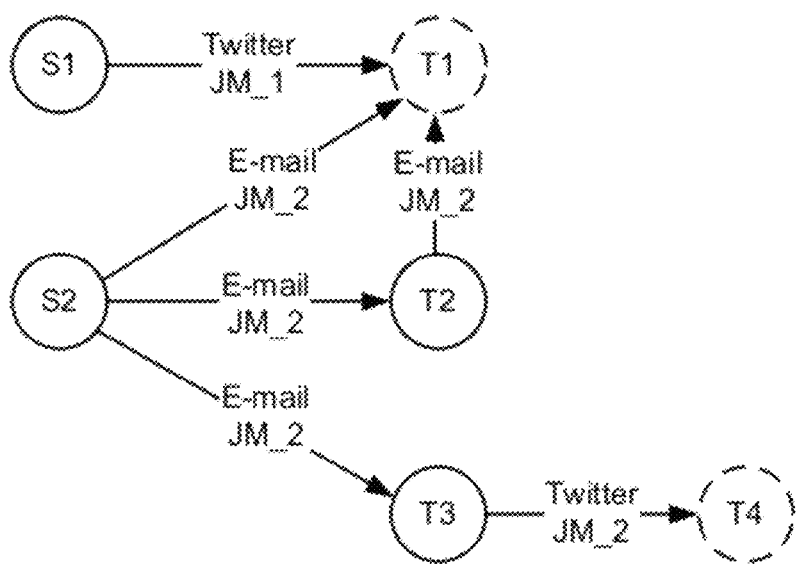

FIG. 6C shows an example in which S1 initially sends a job message for a first job (JM_1) with a company to T1. Subsequently, S2 sends a job message for a second job (JM_2) with the same company to T1, T2, and T3 (JM_2). T3 then forwards the second job (JM_2) to T4. T1 and T4 ultimately apply for the second job. In this example, S1 is credited with the referral of T1 for the second job, if S1 sent the job message about the first job to T1 within the look-back period (e.g., within two month preceding T1 applying for the second job). However, if S1 did not send JM_1 to T1 within the look-back period, the S2 would be credited with the referral. Finally, in this example, S2 is credited with the referral of T4.

As described above, various records are created as the job messages and broadcast messages are sent, viewed, and/or forwarded as well as when users apply for jobs. All of this information may be used to identify the most effective communication channel(s) over which to communicate with a given target. Using the activities conducted by the various users in FIGS. 6A-6C above, the following analytic information may be determined: (i) T1 will respond to job messages/broadcast job messages received over TWITTER and e-mail; (ii) T2 will only respond to job messages/broadcast job messages received over e-mail; (iii) T3 will respond to job messages/broadcast job messages received over FACEBOOK and e-mail; and (vi) T4 will respond to job messages/broadcast job messages received over TWITTER and e-mail.

Figure 6D:
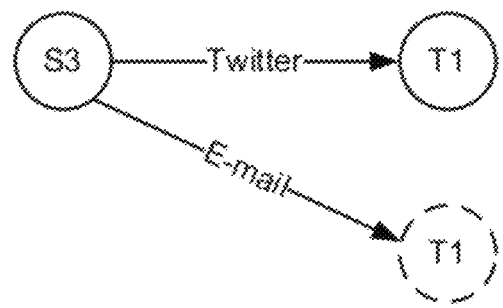
Figure 6E:
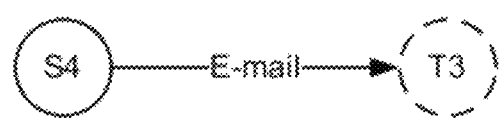
Figure 6F:
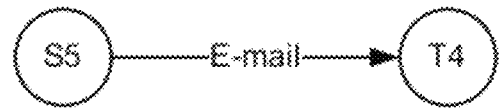

Referring to FIG. 6D, based on the above, information the channel selection service recommends sending a broadcast job message over TWITTER to T1. S3 subsequently sends a broadcast job message over TWITTER to T1 and a job message over e-mail to T1 for the same job. T1 subsequently performs an action on the job message sent via e-mail. Referring to FIG. 6E, based on the above, information the channel selection service recommends sending a job message over e-mail to T3. S4 subsequently sends a job message over e-mail to T3. T3 subsequently performs an action on the job message sent via e-mail. Referring to FIG. 6F, based on the above, information the channel selection service recommends sending a job message over e-mail to T4. S5 subsequently sends a job message over e-mail to T4. T4 does not perform any action on the job message sent via e-mail.

Based on the additional actions taken (and not taken) in FIGS. 6D-6F, the following analytic information may be determined: (i) T1 prefers to receive job messages/broadcast job messages received over TWITTER; (ii) T3 will respond to job messages/broadcast job messages received over FACEBOOK and e-mail—but e-mail may be preferable over FACEBOOK; and (vi) T4 will respond to job messages/broadcast job messages received over TWITTER and e-mail—but e-mail may be preferable over TWITTER.

Figure 7:
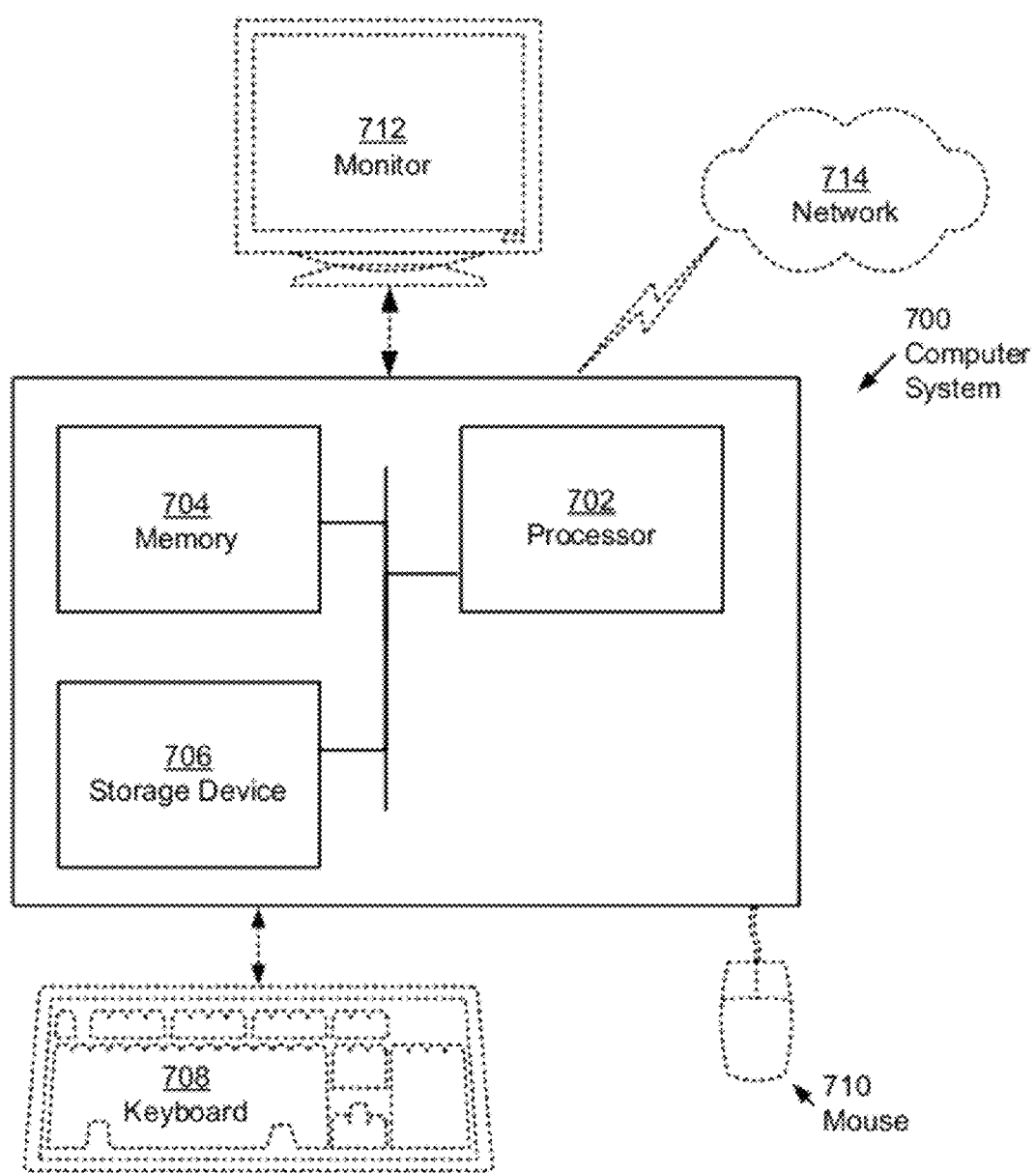
FIG. 7. shows a computer system in accordance with one or more embodiments of the invention.

Embodiments of the invention may be implemented on virtually any type of computer regardless of the platform being used. For example, as shown in FIG. 7, a computer system (700) includes one or more processor(s) (702), associated memory (704) (e.g., random access memory (RAM), cache memory, flash memory, etc.), a storage device (706) (e.g., a hard disk, an optical drive such as a compact disk drive or digital video disk (DVD) drive, a flash memory stick, etc.), and numerous other elements and functionalities typical of today's computers (not shown). The computer (700) may also include input means, such as a keyboard (708), a mouse (710), or a microphone (not shown). Further, the computer (700) may include output means, such as a monitor (712) (e.g., a liquid crystal display (LCD), a plasma display, or cathode ray tube (CRT) monitor). The computer system (700) may be connected to a network (714) (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the computer system (700) includes at least the minimal processing, input, and/or output means necessary to practice embodiments of the invention.

Further, those skilled in the art will appreciate that one or more elements of the aforementioned computer system (700) may be located at a remote location and connected to the other elements over a network. Further, embodiments of the invention may be implemented on a distributed system having a plurality of nodes, where each portion of the invention (e.g., service front-end, referral tracking service, job message service, channel interface engine, job application service, analytics engine, etc.) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions to perform embodiments of the invention may be stored on a computer readable medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system, comprising:
 a job database comprising data for each of a plurality of job messages defining a plurality of jobs,
  wherein each of the plurality of job messages displays at least one active link associated with at least one of the plurality of jobs, and
  wherein each of the plurality of jobs is associated with a company;
 a referral tracking service coupled to the job database and configured to:
  receive, from a client of a first target, a signal indicating activation of a first link associated with a first URL and displayed by a first job message, wherein the first URL is associated with a first job message record and wherein the first job message record is associated with the first job message,
  provide, to the client of the first target, a first web page associated with the first URL, wherein the first web page comprises a description of a first job at the company and a first job referral path, wherein the first job referral path comprises a visual representation of a link between a first sender and the first target,
  receive, from a client of a second target, a signal indicating activation of a second link associated with a second URL and displayed by a second job message, and
  provide, to the client of the second target, a second web page corresponding to the second URL, wherein the second web page comprises the description of the first job and a second job referral path, wherein the second job referral path comprises a visual representation of the link between the first sender and the first target and a link between the first target and the second target,
  make a first determination that a third job message was sent to the second target for a second job at the company by a second sender,
  make a second determination that the second target used a third URL, displayed by the third job message, to access a third web page, wherein the third web page includes functionality to enable the second target to apply for the second job, wherein the second target applies for the second job,
  make a third determination that the second job message was sent to the second target within a look-back period, and
  credit, based on the third determination, the first sender for the referral of the second target for the second job; and
 a job message service coupled to the job database and configured to:
  generate and store the first job message record wherein the first job message record specifies at least: the first URL, a job ID for the first job, a first job message ID associated with the first job message, the first sender, the first target, and a first communication channel;
  receive a request to create a second job message for the first job, wherein the request specifies at least the second target and a second communication channel,
  generate, in response to the request, the second job message, wherein the second job message is associated with the second URL,
  generate and store, in response to the request, a second job message record, wherein the second job message record specifies at least: the second URL, the job ID for the first job, the first job message ID, a second job message ID associated with the second job message, the first target, the second target, the first communication channel, and the second communication channel, wherein the first communication channel is email and the second communication channel is a social network; and a channel interface engine coupled to the job message service and configured to:

send the second job message over the second communication channel to the second target; and an analytics engine coupled to the job database and configured to:

generate the second job referral path using at least the first job message record and the second job message record.

2. The system of claim 1, wherein the analytics engine is further configured to determine how the first job was communicated over a plurality of communication channels between the sender and a plurality of targets, wherein the plurality of communication channels comprise the first communication channel and the second communication channel, and wherein the plurality of targets comprise the first target and the second target.

3. The system of claim 2, wherein the analytics engine is further configured to determine how the first job was communicated over the plurality of communication channels between the sender and the plurality of targets using at least one selected from a group consisting of a job message record and a broadcast job message record.

4. The system of claim 2, wherein the analytics engine is further configured to determine which of the plurality of communication channels is most effective for reaching job candidates that applied for the first job.

5. The system of claim 2, wherein the analytics engine is further configured to determine which employee in the company is most effective for reaching job candidates that applied for the first job, wherein the employee is one selected from a group consisting of the sender and one of the plurality of targets.

6. The system of claim 1, wherein the request to create the second job message for the job is initiated from the first web page.

7. The system of claim 1, wherein the first communication channel is a direct communication channel and the second communication channel is a broadcast communication channel.

8. The system of claim 7, wherein the broadcast communication channel is one selected from a group consisting of a FACEBOOK status update, a LINKEDIN update, a TWITTER status, a FACEBOOK wall post, and a LINKEDIN group post.

9. The system of claim 1, wherein the social network is one selected from a group consisting of TWITTER, FACEBOOK, and LINKEDIN.

* * * * *